United States Patent
Latif et al.

(10) Patent No.: US 11,829,959 B1
(45) Date of Patent: Nov. 28, 2023

(54) SYSTEM AND METHODS FOR FULLY AUTONOMOUS POTHOLES DETECTION AND ROAD REPAIR DETERMINATION

(71) Applicant: Prince Mohammad Bin Fahd University, Dhahran (SA)

(72) Inventors: Ghazanfar Latif, Dhahran (SA); Abul Bashar, Dhahran (SA); Ghassen Ben Brahim, Dhahran (SA); Salahudean Basem Tohmeh, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 17/989,807

(22) Filed: Nov. 18, 2022

(51) Int. Cl.
*G06Q 10/20* (2023.01)
*G06V 20/10* (2022.01)
(Continued)

(52) U.S. Cl.
CPC .......... *G06Q 10/20* (2013.01); *B64C 39/024* (2013.01); *G05D 1/104* (2013.01); *G06F 16/29* (2019.01); *G06N 5/01* (2023.01); *G06T 7/0008* (2013.01); *G06V 10/82* (2022.01); *G06V 20/17* (2022.01); *G06V 20/182* (2022.01); *G06V 20/46* (2022.01);
(Continued)

(58) Field of Classification Search
None
See application file for complete search history.

(56) References Cited

U.S. PATENT DOCUMENTS

2008/0162034 A1\* 7/2008 Breen ................ G01C 21/3461
701/533
2014/0334689 A1\* 11/2014 Butler ..................... G06T 7/254
382/108
(Continued)

FOREIGN PATENT DOCUMENTS

| KR | 20200007165 A | * | 1/2020 |
| KR | 10-2084668 B1 | | 3/2020 |
| WO | WO-2021076573 A1 | * | 4/2021 |

OTHER PUBLICATIONS

Syed-Ali Hassan, et al., "An Improved Deep Convolutional Neural Network-Based Autonomous Road Inspection Scheme Using Unmanned Aerial Vehicle", Electronics, vol. 10, Issue 22, Nov. 12, 2021, pp. 1-16

*Primary Examiner* — Delomia L Gilliard
(74) *Attorney, Agent, or Firm* — Oblon, McClelland, Maier & Neustadt, L.L.P.

(57) ABSTRACT

A pothole monitoring and repair system for a road surface includes at least one UAV which includes a video camera, a video processor, a computing unit and a global positioning receiver. The UAV generates video streams of road surfaces using the video camera which are processed by the video processor to extract road frames. The computing unit generates a geo-fenced area of the road surface, and determines whether there is at least one pothole in each of the road frames within the geo-fenced area. The cloud server generates a map of the geo-fenced area, labels location coordinates of each pothole on the map, identifies and labels geographical features in the road frames within the geo-fenced area, extracts pothole features in the road frames, and uses a classifier to predict repair actions based on pothole features and geographical features, which are presented on a front end interface.

19 Claims, 9 Drawing Sheets

(51) Int. Cl.
  *G06V 20/17*   (2022.01)
  *G06V 20/40*   (2022.01)
  *G06V 10/82*   (2022.01)
  *G05D 1/10*    (2006.01)
  *G06F 16/29*   (2019.01)
  *G06N 5/01*    (2023.01)
  *B64C 39/02*   (2023.01)
  *G06T 7/00*    (2017.01)
  *G06V 20/58*   (2022.01)
  *B64U 101/30*  (2023.01)
  *B64U 101/26*  (2023.01)

(52) U.S. Cl.
  CPC .......... *G06V 20/58* (2022.01); *B64U 2101/26* (2023.01); *B64U 2101/30* (2023.01); *G06T 2207/10016* (2013.01); *G06T 2207/10032* (2013.01); *G06T 2207/20081* (2013.01); *G06T 2207/20084* (2013.01); *G06T 2207/30184* (2013.01)

(56) References Cited

U.S. PATENT DOCUMENTS

| | | | |
|---|---|---|---|
| 2016/0093212 A1* | 3/2016 | Barfield, Jr. | G08G 1/04 348/144 |
| 2016/0292518 A1* | 10/2016 | Banitt | G06V 20/56 |
| 2019/0375429 A1* | 12/2019 | Gardner | B60W 30/08 |
| 2020/0042953 A1* | 2/2020 | Maston | G08G 1/0112 |
| 2020/0103552 A1* | 4/2020 | Phelan | G01S 13/95 |
| 2020/0394474 A1* | 12/2020 | Vallespi-Gonzalez | G06F 18/241 |
| 2022/0101272 A1* | 3/2022 | Sunde | G06Q 10/20 |

* cited by examiner

SYSTEM AND METHODS FOR FULLY AUTONOMOUS POTHOLES DETECTION AND ROAD REPAIR DETERMINATION

BACKGROUND

Technical Field

The present disclosure is directed to a detection of potholes, and more particularly relates to a system and methods for fully autonomous potholes detection and road repair determination.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Road users such as automobiles, bicyclists, or motorcyclists require thoroughfares which receive timely and appropriate maintenance. For safety, the road must be well maintained. Weather conditions such as atmospheric heat, rains, and/or low temperatures create conditions for slow deterioration of a road. In addition to the weather conditions, other factors such as high traffic volumes, vehicle density, and types of vehicle (for example, heavy transport vehicles (HTV)), affect the roads, leading to deterioration.

In many countries, government and/or private companies are entrusted with the maintenance of roads. These organizations inspect the roads periodically or when there are complaints. Road inspection is a time-consuming process and requires resources such as dedicated vehicles and human resources. The human resources include a human inspector who traverses a plurality of roads inspecting deteriorations in the roads. Based on observations and severity levels of road deterioration, the human inspector prepares a report for repair work. The managing organization may assign skilled taskmen to repair or restore the roads based on the report. The conventional procedure of road inspection is manual, laborious, resource intensive, and time-consuming, requiring the organizations to spend significant time and resources just inspecting the road surfaces.

Accordingly, it is an object of the present disclosure to provide a system and methods for road surface inspection that can detect potholes and other defects on a road and prioritize the repair of the potholes and other defects by determining which potholes or other defects require immediate repair, those that require repair after a passage of certain time or those that require no repair at all.

SUMMARY

In an exemplary embodiment, the present invention discloses a pothole monitoring and repair system for a road surface. The system includes a plurality of autonomous unmanned aerial vehicles (UAVs). Each UAV is equipped with a video camera, a video processor, a computing unit and a global positioning receiver. The global positioning receiver in each UAV is configured to provide location coordinates of the UAV. The video camera in each UAV is configured to generate video streams of a plurality of road surfaces. The video processor in each UAV is configured to preprocess and extract road frames from the video streams. The computing unit in each UAV is configured to perform multiple operations comprising utilizing the global positioning receiver to generate a geo-fenced area of the road surface, determining whether there is at least one pothole in each of the road frames within the geo-fenced area, generating a communication packet including the road frames, the location coordinates of each of the road frames and the potholes identified in the road frames, and transmitting the communication packet. The system includes a cloud server communicably connected to each of the UAVs to receive the communication packet. The cloud server includes a computing circuitry, a memory including program instructions, a classifier and at least one processor configured to use the program instructions to generate a map of the geo-fenced area of the road surface, label the location coordinates of each pothole on the map, identify geographical features in the road frames within the geo-fenced area. The geographical features include any one of population, traffic load, traffic type, and location type. The processor is configured to label the geographical features on the map, extract pothole features including a number of the potholes within each road frame, an average size of the potholes, and a frequency of a pothole occurrence per kilometer of the geo-fenced area. The processor is configured to apply the pothole features and geographical features to the classifier. The classifier is configured to predict classes for repair actions. The system includes a front-end interface communicably connected to the cloud server. The front-end interface includes a computer operatively connected to a display. The computer is configured to generate road repair recommendations for each pothole based on each class and provide visualization of a pothole repair process on the display.

In another exemplary embodiment, a method for pothole monitoring and repair of a road surface overflown by a plurality of autonomous unmanned aerial vehicles is disclosed. The method includes generating, by a global positioning receiver located in each UAV, location coordinates of the respective UAV. The method includes generating, by the global positioning receiver in a respective UAV, a geo-fenced area of the road surface beneath the respective UAV. The method includes generating, by a video camera located in the respective UAV, a set of video streams of the geo-fenced area beneath each respective UAV. The method includes preprocessing, by a video processor connected to the camera, the set of video streams of the geo-fenced area. The method includes extracting, by the video processor, a set of road frames from the set of video streams. The method includes determining, by a computing unit located in each UAV operatively connected to the video processor, whether there is at least one pothole in each set of road frames within the geo-fenced area. The method includes generating, by the computing unit, a communication packet including the set of road frames, the location coordinates of each of the road frames and the potholes identified in each of the road frames. The method includes transmitting, by the computing unit, the communication packet to a cloud server. The method also includes receiving, by the cloud server, the communication packet wherein the cloud server includes a computing circuitry, a memory including program instructions, a classifier and at least one processor configured to use the program instructions for generating a map of the geo-fenced area of the road surface, labelling the location coordinates of each pothole on the map, identifying geographical features in the road frames within the geo-fenced area, wherein the geographical features include any one of population, traffic load, traffic type, and location type, labelling the geographical features on the map, extracting pothole features including a number of the potholes within each road frame, an average size of the potholes, and a frequency of a pothole occurrence per kilometer of the geo-fenced area, applying the pothole features and geographical features to the classifier, wherein the classifier is configured to predict classes for repair actions, and predicting the classes for repair actions. The method includes, receiving, by a front-end interface communicably connected to the cloud server, the classes, and the map, wherein the front end interface includes a computer operatively connected to a display and wherein the computer is configured for generating road repair recommendations for each pothole based on each class and providing visualization of a pothole repair process on the display.

In another exemplary embodiment, a non-transitory computer readable medium having instructions stored therein that, when executed by one or more processors, cause the one or more processors to perform a method of pothole monitoring and repair of a road surface overflown by a plurality of autonomous unmanned aerial vehicles (UAVs). The method includes generating, by a global positioning receiver located in each UAV, location coordinates of the respective UAV. The method includes generating, by the global positioning receiver in a respective UAV, a geo-fenced area of the road surface beneath the respective UAV. The method includes generating, by a video camera located in the respective UAV, a set of video streams of the geo-fenced area beneath each respective UAV. The method includes preprocessing, by a video processor connected to the camera, the set of video streams of the geo-fenced area. The method includes extracting, by the video processor, a set of road frames from the set of video streams. The method includes determining, by the one or more first processors, whether there is at least one pothole in each set of road frames within the geo-fenced area. The method includes generating a communication packet including the set of road frames, the location coordinates of each of the road frames and the potholes identified in each of the road frames.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
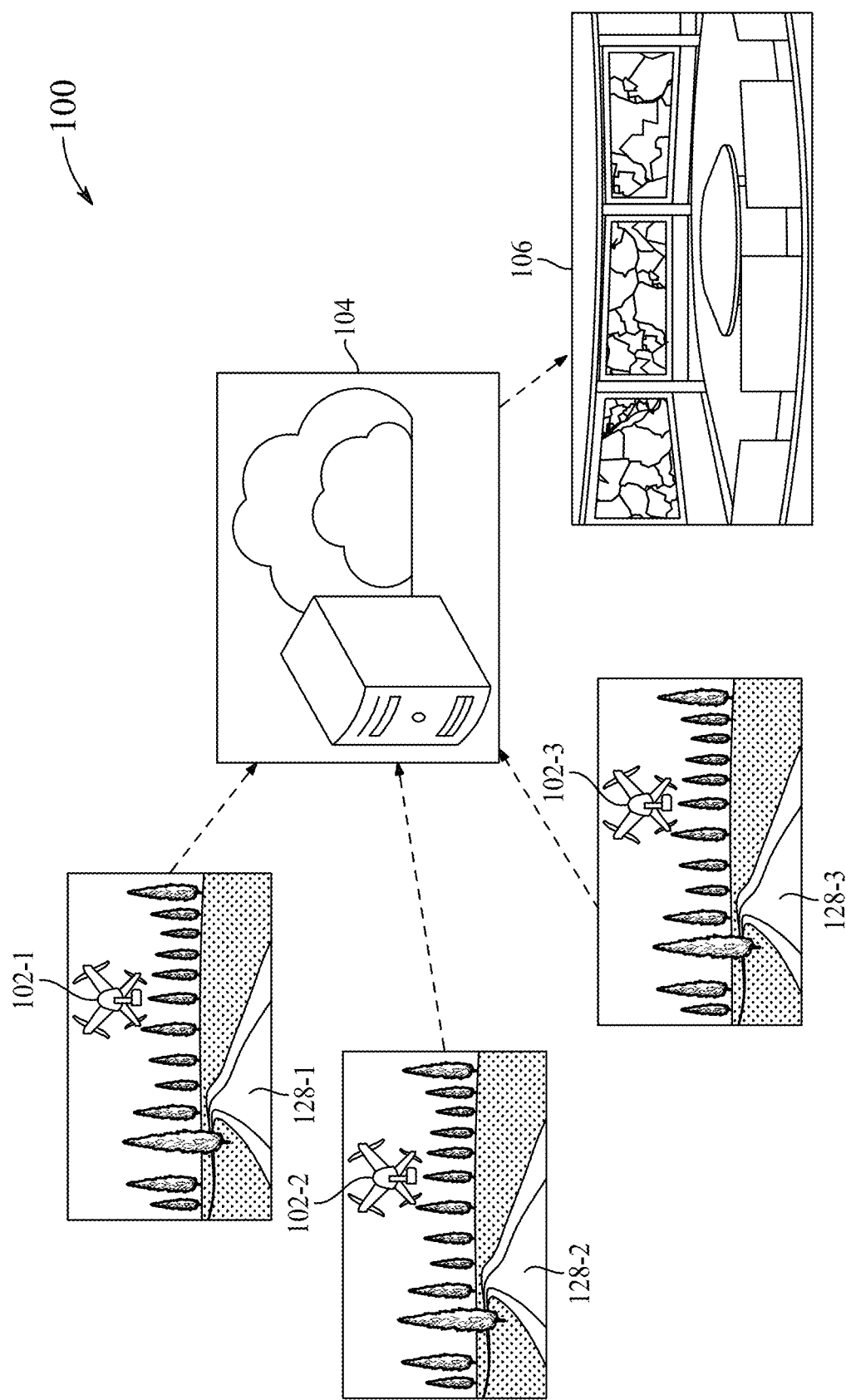
FIG. 1A is an exemplary illustration of a block diagram of autonomous pothole detection and road repair determination system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

FIG. 1A is an exemplary high level schematic diagram illustrating autonomous pothole monitoring and repair system 100 (hereinafter "the system 100"), according to an embodiment. The system 100 includes a plurality of unmanned aerial vehicles (UAVs) 102 (such as a UAV 102-1, a UAV 102-2 and a UAV 102-3, hereinafter interchangeably referred to as UAVs 102) to capture videos of a plurality of road surface 108 (such as road surface 108-1, road surface 108-2 and road surface 108-3) respectively. In an example, the UAVs 102 may be drones. In some examples, the UAV 102 may be configured to operate autonomously. The UAVs 102 may be configured to fly at, for example, 10 m-15 m above the road surface 108 to avoid collision with vehicles travelling on the road. The UAVs 102 traverse the corresponding road allotted for inspection, generate video streams, and generate communication packets having road frames that have potholes or anomalies. The UAVs 102 communicate the communication packets to a cloud server 104.

The cloud server 104, communicatively coupled to each of the UAVs 102, receives the communication packets from the UAVs 102. The cloud server 104 processes the communication packets, generates a map with location coordinates of each pothole marked on the map, classifies the potholes using a trained machine learning processor, predicts the classes for repair action and generates road repair recommendations for each pothole based on each class. The map with location coordinates of each pothole marked on the map, the classification of the pot holes, the class for repair actions and the road repair recommendations for each pothole based on each class is presented on a front-end interface 106 communicatively coupled to the cloud server 104. The front-end interface 106 displays a real-time map of the road surfaces 108 including the pothole images, location coordinate and/or a pothole repair process for each pothole. The front-end interface 106 may refer to computing device having a display device such as a cellphone, laptop, desktop, or display device in a central station such as a municipal corporation, company, interested observer, or the like.

Figure 1B:
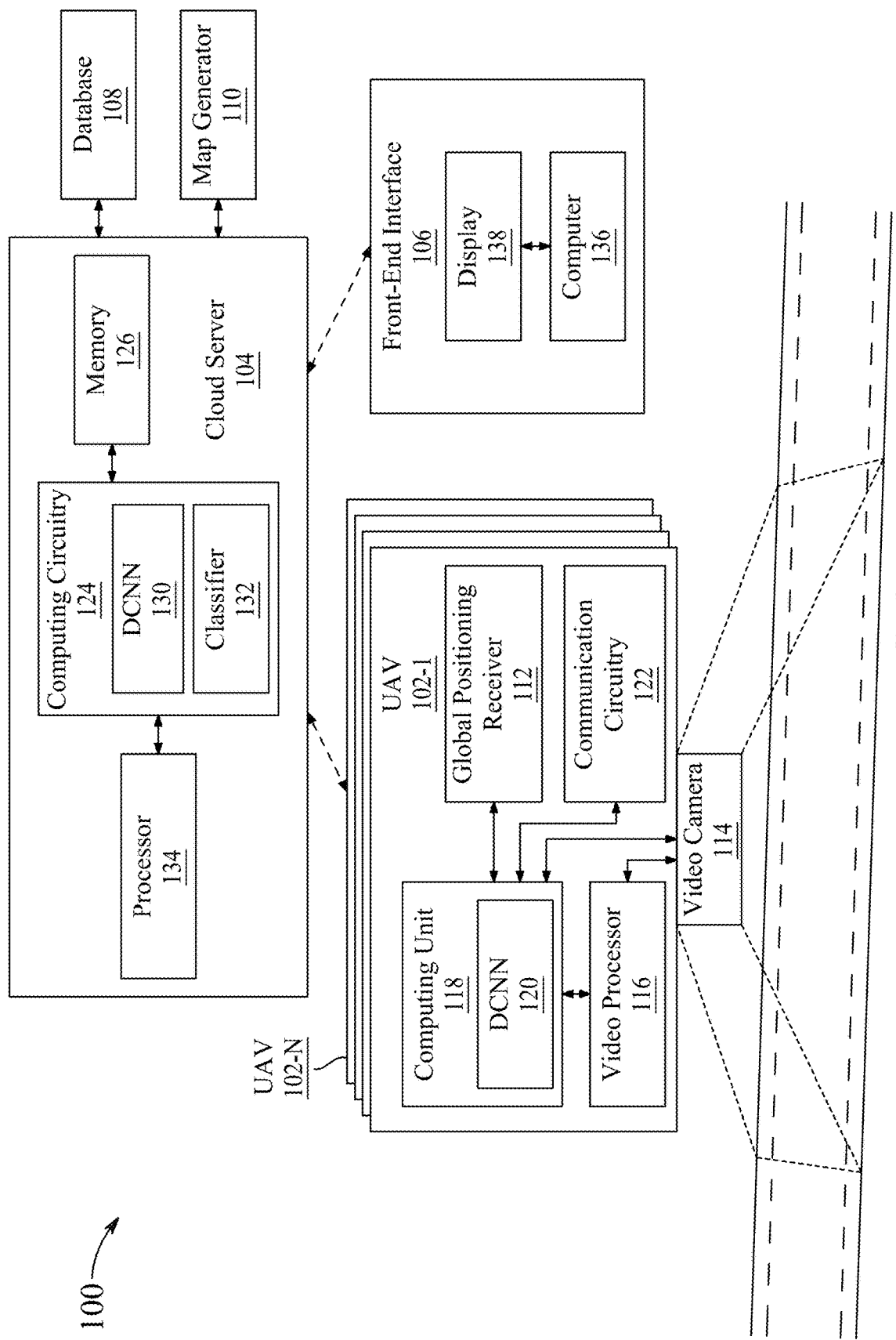
FIG. 1B is a schematic diagram illustrating internal components of the autonomous pothole detection and road repair determination system, according to certain embodiments.

As shown in FIG. 1B, a command and control center, using computer 136, accesses the cloud server through the front-end interface 106 to obtain information of potholes on the map. The front-end interface 106 generates a visualization of the roads. The visualization includes an image of each road frame including the at least one pothole, first graphics including the location coordinates of the road frame including at the least one pothole, the number of potholes within each road frame, the average size of each pothole, the frequency of the pothole occurrence per kilometer of the geo-fenced area, the population, traffic load, traffic type and location type, and second graphics including a recommendation for the repair action of each pothole, a schedule for repairing each pothole, and a status of the potholes for user to perform further steps. A human supervisor in the command and control center may direct the overall process of monitoring and repairing the potholes by determining a section of road to be inspected, dispatching the UAVs to perform the video monitoring, setting the geo-fenced area for each UAV, selecting the potholes to repair based on the classification of the potholes and the repair recommendations and dispatching road crews to perform the repairs.

FIG. 1B is a schematic diagram of pothole monitoring and repair system 100 (hereinafter referred to as the system 100), according to an embodiment. The system includes one or more UAVs 102 (such as a UAV 102-1, a UAV 102-2, a UAV 102-3, . . . a UAV 102-N, hereinafter interchangeably referred to as UAVs 102), a cloud server 104, a front-end interface 106, a database 108, and a map generator 110.

For simplicity of explanation, a single-unit UAV 102 is used for describing the system. However, the description is equally applicable to other UAVs in the system 100. The UAVs may be a quadrotor, a quadcopter, a drone, a pilotless vehicle, an automatic flying vehicle, automated aircraft, a multicopter, an autonomous aerial drone and/or the like. In an example, the UAV 102 may be a battery-operated vehicle or a solar-power-operated vehicle. In some examples, the UAV 102 may be a conventional fuel-operated vehicle. In some examples, the UAV 102 may be configured to operate autonomously. In some examples, the UAV 102 may be partially controlled or remotely operated. In instances where the UAV 102 is remotely operated, the remote operator may use various communication means to control the flight paths of the UAV 102.

The UAV 102, among other circuits, includes a global positioning receiver 112, a video camera 114, a video processor 116, a computing unit 118, and communication circuitry 122. The global positioning receiver 112 is a global position system (GPS) receiver unit configured to continuously track location coordinates of the UAV 102. In some instances, the global positioning receiver 112 may be activated when the UAV 102 is initiated for road monitoring operation. The global positioning receiver 112 tracks and provides location information or coordinates of the UAV 102 to the computing unit 118. The global positioning receiver 112 may be chosen from known global positioning receivers such as, manufactured by Garmin™, Standard Horizon™, Raymarine™, and such companies. In some examples, the global positioning receiver 112 may be a proprietary receiver designed for the UAV 102.

The video camera 114 is used for capturing video in a defined field of view. In an example, the video camera 114 is located below the UAV 102 such that the road surface can be captured when the UAV 102 is in operation. In an aspect, the video camera 114 may be configured to automatically adjust its field of view to cover at least a defined width of the road surface. During the operation, the video camera 114 generates a video stream of a plurality of road surfaces that the UAV 102 traverses. In examples, the video camera 114 may be an RGB camera, a three-dimensional (3D) camera, a time of flight (TOF) camera, an infrared camera, an event-based camera, and the like. In some examples, the UAV 102 may have more than one camera or an array of cameras for generating stereoscopic images and/or enhanced video stream quality. In some examples, the UAV 102 may have additional components to support video capturing and generation. For example, the UAV 102 may include a light shade positioned around the video camera 114 to prevent unwanted light incidence (for example, due to sunlight, other source of lights, reflections, etc.) on lens of the video camera 114 that could cause distortions in the video streams. In some examples, the UAV 102 may comprise additional peripheral components such as mirrors positioned at defined angles with respect to the video camera 114 to aid in improved depth perception of the potholes and/or to generate a 3D view of a captured road surface, for example, to determine a depth of a pothole from a plurality of angles for better and enhanced perception. In some examples, the video camera 114 may include various features such as a brightness enhancer, a contrast enhancer, a color enhancer, a hue enhancer and/or the like, to aid in generating the video streams as accurately as possible. Aforementioned features may be automatically controlled based on the lighting conditions of the surrounding environment. In some examples, the video camera 114 may include infrared features or a source of light integrated with the video camera 114 to aid in inspecting the road surface and generating videos in low-light conditions or at night.

The video processor 116 preprocesses the generated video streams preprocess and extracts road frames from the video streams of the plurality of road surfaces. Preprocessing includes preparing video streams to facilitate faster processing. The road frame may refer to images of road surface determined from the video streams. In an example, the road frame may refer to an image of a section of the road. In an aspect, the video processor 116 obtains images of the road surface from the video streams, processes the images to identify consecutive images of the road surface, and combines the images by stitching the images together to generate road frames. Each road frame may represent at least a portion of a length of a road. The video processor 116 may be a conventional video processor that is manufactured by organizations such as Nvidia corporation, Advanced Micro Devices, Inc., Intel corporation, or the like, or a proprietary video processor.

The computing unit 118 obtains and processes the road frames from the video processor 116. In an example, the computing unit 118 processes the road frames by obtaining location coordinates from the global positioning receiver 112, applying the location coordinates on the road frames, and generating a geo-fenced area of the road surface. The geofencing may refer to a process of generating a virtual boundary around the road surface to mark the road. The geo-fenced area includes a start location coordinate, an end location coordinate, and a section of the road surface between the start location coordinate and the end location coordinate. In an example, the computing unit 118 may apply image processing techniques to identify and generate a geo-fenced area for the road surface. The computing unit 118 processes the road frames within the geo-fenced area to determine whether there is at least one pothole in each of the road frames within the geo-fenced area. In examples, the computing unit 118 may apply machine learning techniques such as the DCNN 120 to determine the potholes in the road frames within the geo-fenced area. The DCNN 120 includes one or more layers of neural networks to learn and analyze the road frames to determine the potholes. The DCNN 120 is trained to identify one or more potholes or anomalies in the images. For training purposes, the DCNN 120 may be fed with a plurality of road images and continuously trained to identify at least one pothole or anomaly in the road frames. In an example, the DCNN 120 may be fed about 30,000 images of road frames having potholes for training. The DCNN 120 is also tested with test road images of road frames having potholes to check whether the DCNN 120 is able to determine potholes in the test road frames. If the accuracy is below a threshold (for example, less than 95%), additional training is provided to improve the accuracy of the DCNN 120. Processing the road frames using the DCNN 120 is explained in detail in FIG. 1C. The computing unit 118 generates a communication packet that includes the road frames, the location coordinates of each of the road frames, and the potholes identified in the one or more road frames. The computing unit 118 uses the communication circuitry 122 to communicate the communication packet to the cloud server 104. In some examples, the computing unit 118 communicates the communication packet over the network. The computing unit 118 may be a microprocessor unit, a microcontroller unit, or any processor operating the UAV 102 as described herein. In some examples, the computing unit 118 may be an Intel processor (manufactured by Intel Corporation, 1900 Prairie City Rd, Folsom, CA 95630, United States), an Advanced Micro Devices processor (manufactured by AMD inc., 2485 Augustine Dr, Santa Clara, CA 95054, United States) or such processor.

The cloud server 104 receives the communication packet. The cloud server 104 is a virtualized server executing in a cloud computing environment having resources that are accessible over an Internet. The cloud server 104 is configured to process the communication packet to provide road repair recommendations. The cloud server 104 includes a computing circuitry 124, a memory 126 including program instructions, a classifier 132 and at least one processor 134. The at least one processor 134 executes the program instructions to process the communication packet. Using the information in the communication packet, the at least one processor 134 generates a map of the geo-fenced area of the road surface. In an aspect, the cloud server 104 may utilize map services such as the map generator 110 provided by map-based service providers such as Google Maps (provided by Google LLC, located at 1600 Amphitheatre Parkway, Mountain View, California, U.S.) or any such map service providers to generate a map having the geo-fenced area of the road surface. The at least one processor 134 processes the map to mark or indicate one or more locations on the road having potholes on the map. For each pothole, the at least one processor 134 labels the location coordinates of the corresponding pothole on the map. The at least one processor 134 identifies geographical features in the road frames within the geo-fenced area. The geographical features include one or more of a population feature, a traffic load feature, a traffic type feature, and a location type feature. The population feature may refer to a density of population. The traffic load feature may refer to classification of traffic into heavy traffic, low traffic or moderate traffic. The traffic type feature may refer to type of the traffic on the road, that is, traffic having heavy traffic vehicles (HTV) or light motor vehicles (LMV) or combination of both. The location type feature may refer to whether the location is an urban location or a rural location. The at least one processor 134 labels the identified geographical features on the map.

The at least one processor 134 processes the road frames to extract pothole features including a number of potholes within each road frame, an average size of the potholes, and a frequency of a pothole occurrence per kilometer of the geo-fenced area. The at least one processor 134 processes the geo-fenced area using image processing techniques to extract the pothole features. The at least one processor 134 applies the pothole features and geographical features to the classifier 132 of a machine learning technique. In an example, the classifier 132 is a random forest classifier technique. The classifier 132 processes the pothole features and geographical features and predicts classes for repair actions based on the pothole and geographical features. The at least one processor 134 generates road repair recommendations for each pothole based on each class. The recommendations for the repair actions include immediate complete repair, immediate patches repair, repair in next 6 months, no repair, etc. The at least one processor 134 may label or place road repair recommendations for each pothole based on each class on the map at the location of the pothole.

The at least one processor 134 stores the road frames, the location coordinates of each of the road frames, the potholes identified in the road frames, the geographical features, and the pothole features in the database 108. Based on changes to the road surfaces, for example, new potholes, repaired potholes, road overhaul, etc., the at least one processor 134 may update the database 108 with status of roads periodically, on a live-basis or on a demand-basis.

The maps, pothole data, or status may be accessed using front-end interface 106 communicatively coupled to the cloud server 104. The front-end interface 106 may be used to obtain the map and provide visualization of a pothole repair process on a display 138. The front-end device 106 may be a computer 136 having a display 138. The computer may include a stand-alone computer, a laptop, a mobile device, a personal digital assistant (PDA) or any custom computing device for road repair operations. The visualization includes providing a map having images of each road frame including at the least one pothole, first graphics including the location coordinates of the road frame including at the least one pothole, the number of potholes within each road frame, the average size of each pothole, the frequency of the pothole occurrence per kilometer of the geo-fenced area, the population, traffic load, traffic type and location type, and second graphics including a recommendation for the repair action of each pothole, a schedule for repairing each pothole, and status of the repair of each pothole.

The working of UAV 102 for inspecting the road surface is described in detail with reference to FIG. 1A. Although there are multiple UAVs 102, the description is provided explaining the working using one UAV 102, which can be equally applied to other UAVs. To begin road monitoring operation, location coordinates are provided to the UAV 102. The location coordinates include a start location coordinate and an end location coordinate of a road to be inspected. In an aspect, the location coordinates are automatically fed using a remote system (not shown). The UAV 102 is placed at the start location coordinate, or the UAV 102 is moved to the start location coordinate based on the start location coordinate. The computing unit 118 of the UAV 102 confirms the current location to be the start location coordinate of the road and initiates the video camera 114 to generate a video stream of the road surface. When the road monitoring operation is initiated, the UAV 102 may position itself to capture at least a defined portion of a road surface. The UAV 102 traverses the road following a linear path over the road to capture and generate video streams of the road surface starting from the start location coordinate to the end location coordinate. In an aspect, the computing unit 118 refers to a processor and associated circuits such as a memory of the UAV 102 that is configured to perform all computations as well as controlling the individual components such as the video camera 114, video processor 116 and global positioning receiver 112. The UAV 102 through the computing unit 118 may adjust the video camera 114 to adjust its field of view to cover at least a defined part of the road surface. In some examples, the UAV 102 may adjust its height from the ground surface to cover at least a defined part of the road surface. For example, the UAV 102 may automatically adjust the distance between itself and the road surface such that the UAV 102 flies feet above the road surface to prevent collision with any object, such as vehicles, bridges, walkways, poles, wires, etc. In some examples, the UAV 102 may be configured to fly closer to the road surface and adjust its height when any object or vehicle appears during the road monitoring operation. The UAV 102 moves from the start location coordinate to the end location coordinate over the road capturing the video of the road surface and generating a video stream of the road surface. The global positioning receiver 112 coupled with the computing unit 118 generates location coordinates corresponding to the video streams.

The video processor 116 of the UAV 102 preprocesses the video stream and extracts road frames from the video streams. To elaborate, the video processor 116 processes the video stream by applying image/video processing techniques. Using the image/video processing techniques, the video processor 116 identifies various stretches of road and extracts road frames from the video streams. The road frame may cover a pre-defined length of the road. In some examples, the road frame may be based on the length of the road and the capacity of the video camera 114. In an example, if a distance between the start and end location coordinate is 1 km, the video processor 116 is configured to extract road frames, with each road frame covering 40-50 meter length of road. Accordingly, there may be multiple road frames for each road. Considering the above example, there may be 20-25 frames for 1 kilometer distance.

The computing unit 118 utilizes the global positioning receiver 112 to generate a geo-fenced area of the road surface. In an example, the geo-fenced area is a virtual boundary or a virtual perimeter that covers a section of the road surface. In some examples, the geo-fence may be displayed as a virtual boundary (such as using colored line) covering the road surface on a map. The computing unit 118 tags each road frame with corresponding location coordinates, such that the road frames can be identified based on their respective location coordinates. The computing unit 118 processes each road frame within the geo-fenced area to determine whether there is at least one pothole or anomaly on the road that could lead to a pothole in near future. For processing road frames to detect the presence of a pothole and/or anomalies, the computing unit 118 uses a DCNN 120-1 as described in FIG. 1C.

Figure 1C:
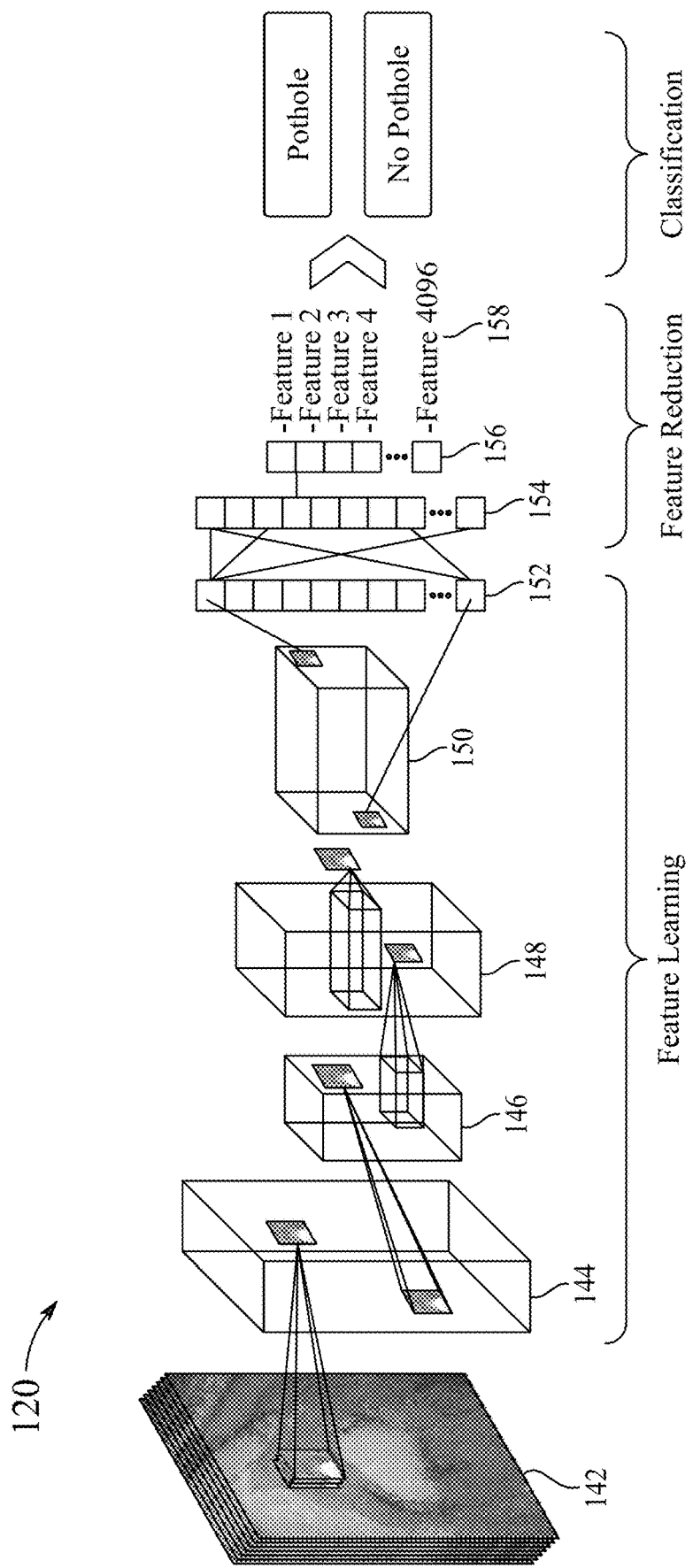
FIG. 1C is an exemplary illustration of convolutional layers of deep convolution neural network to process road frames to identify the presence of at least one potholes in road frames, according to certain embodiments.

FIG. 1C is an exemplary illustration of convolutional layers of the deep convolution neural network (DCNN) 120 which process road frames to identify the presence of potholes in the road frames, according to an embodiment. The DCNN 120 includes multiple layers for processing road frames to identify the presence of potholes. For example, the DCNN 120 includes an input layer 142 configured to receive the road frames. The input layer 142 receives the road frames and their coordinates from each of the UAV 102 as input. The DCNN 120, in an example, may apply zero padding to each of the road frames to normalize its size. Zero padding involves adding pixels of zero value around the edges of the image of the road frame to preserve the original size of the input road frame during convolution operations. The zero padding prevents kernel overlapping due to shrinking of dimensions of the image of the road frame during the convolutional operations. Also, the zero-padding speeds up calculations during the convolution operations. In some examples, the input layer 142 may be able to process the road frame without zero padding. The processed frame (also referred to as an output frame) is communicated to a first convolution and rectified linear unit (ReLU) layer 144 which is connected to the input layer 142. In an example, the ReLU of the first convolution and ReLU layer 144 may refer to a linear function that outputs the input when the input is positive, otherwise, the ReLU layer 144 outputs a zero value. The ReLU is also referred to as an activation function. The first convolution and ReLU layer 144 is configured to search each road frame and generate a feature map of each road frame. Applying the rectifier function of ReLU increases non-linearity in the road frames. The first convolution and ReLU layer 144 communicates a generated feature map to a first pooling layer 146.

The first pooling layer 146 coupled to the first convolution and ReLU layer 144 is configured to process the feature maps and downsample the feature maps by summarizing the presence of features in patches of the feature maps of the road frames. The first pooling layer 146 progressively reduces the spatial size of a given feature map, so that number of computations in the neural network is reduced. In some examples, the first pooling layer 146 down samples the feature maps removing noise, smoothening the data, and preventing overfitting of a model to the input data. In examples, the first pooling layer 146 may be based on average pooling, max pooling, min pooling or any other pooling technique.

The down sampled features maps are forwarded to a second convolution and ReLU layer 148. The second convolution and ReLU layer 148 coupled to the first pooling layer 146 calculates a weighted sum of the feature map and determines which neurons in the CNN are kept and which neurons are rejected, and correspondingly decides whether to retain or discard the feature map. The second convolution and ReLU layer 148, therefore, acts as a non-linear activation function which rejects neurons that have higher weights. The feature map from the second convolution and ReLU layer 148 is communicated to a second pooling layer 150 coupled to the second convolution and ReLU layer 148. The second pooling layer 150 down samples the retained feature maps. The output of the second pooling layer 150 is represented as column vectors which form an input to a classical neural network (NN) which further has multiple layers.

The column vectors are communicated to a dropout layer 152 that is connected to the second pooling layer 150. The dropout layer 152 removes selected columns in the retained feature maps. In some examples, the dropout layer 152 removes the selected columns by randomly deactivating some neurons of the layer, thus nullifying their contribution to the output. Therefore, the dropout layer 152 acts as a mask that nullifies the effect of some neurons towards the next layer and leaves other neurons unchanged. The output of the dropout layer 152 (modified retained feature map) is provided to a flattening layer 154 which is connected to the dropout layer 152. The layers between the first convolution and ReLU layer 144 and the dropout layer 152 are associated with feature learning. The flattening layer 154 performs a flattening process. The flattening process involves converting all the resultant 2-dimensional arrays from pooled feature maps into a single long continuous linear vector. In an aspect, the flattening layers 154 converts the two-dimensional arrays from the pooled layer feature maps to a single dimensional linear vector of data i.e., converts the retained feature maps with selected columns removed into a single-dimensional linear vector.

The single-dimensional linear vector is communicated to a dense layer 156. The dense layer 156 is coupled to the flattening layer 154. The dense layer 156, also referred to as a fully connected layer, is a layer that is used in the later stages of the CNN. The dense layer 156 connects each feature of a retained feature map to a respective feature of an adjacent previous retained feature map. A dense layer 156 has a layer that is deeply connected with its preceding layer, meaning that the neurons of the layer are connected to every neuron of its preceding layer. The dense layer 156 classifies the image based on output from convolutional layers.

A softmax layer 158 is connected to the dense layer 156. The softmax function is used as an activation function in the output layer of the CNN that estimates a multinomial or a binary probability distribution function. In other words, the softmax layer 158 converts the single-dimensional linear vector to a probability density function and determines whether there is a pothole or no pothole in the single-dimensional linear vector in the given frame. The output of the softmax layer 158 indicates the images of the road frames having pothole. In some examples, the softmax layer 158 may also be configured to identify images having anomalies that can lead to potholes. The layers between the dropout layer 152 and the softmax layer 158 are associated with feature reduction. The classification occurs at the softmax layer 158.

In some examples, there may be possibilities of occurrence of potholes in multiple road frames between the start and end location coordinates. For example, the road frame may contain only one pothole. In another example, a single road frame may contain more than one pothole. In one or more aspects, the road frame of a specific segment of the road surface may have anomalies that may likely lead to a pothole(s) which would also need a repair. In some aspects, the road frame may not have a single pothole, confirming a good condition of the road which does not need any sort of repair. As such, there are multiple locations throughout the start location coordinate and end location coordinates where one pothole, more than one pothole, anomalies, defects, an unbroken surface, or the like, may exist.

The computing unit 118 obtains the one or more road frames having potholes determined using the DCNN 120 and tags location coordinates corresponding to locations of the road frames. For example, the computing unit 118 may tag a location coordinate to a $2^{nd}$ road frame that contains one pothole, a second location coordinate to $10^{th}$ road frame having 3 potholes, etc. The computing unit 118 generates a communication packet including the road frames, the location coordinates of each of the road frames and the potholes identified in the road frames. The computing unit 118 transmits the communication packet to the cloud server 104. In an aspect, the UAV 102 may have a communication circuitry 122 having networking hardware and capability to connect with communication networks via the internet, Bluetooth, 2G, 3G, 4G, 5G connectivity, RFID based communication, etc., to transmit the communication packet to the cloud server 104. The communication packet may be transmitted periodically or when a road frame having a pothole is detected. In some instances, the communication networks may become unavailable for the UAV 102 due to terrain, large obstacles, etc. In such instances, the computing unit 118 may store the communication packets in a memory device (not shown) and transmit the communication packets when the communication network becomes available.

The cloud server 104 is communicably connected to each UAV 102 and configured to receive the communication packets from the UAV 102. The at least one processor 134 of the cloud server 104 generates a map of the geo-fenced area from the start location coordinate to the end location coordinate of the road surface. The geo-fenced area may be represented, for example, as a marked boundary between the start location coordinate and the end location coordinate around the road surface. In an aspect, the cloud server 104 may utilize the map services of the map generator provided by the map based service providers that are external to the cloud server 104. In an aspect, the cloud server 104 may be communicably coupled to a map generator 110. In some examples, the map generator may be an integral part of the cloud server 104.

The at least one processor 134 labels the location coordinates of each pothole on the generated map. Since, all road frames (including the road frames having potholes) have the location coordinates tagged with the road frames, the at least one processor 134 labels the location coordinate, for example, $2^{nd}$, $10^{th}$ and the $15^{th}$ road frame and their location coordinates, such as 26.144497 Latitude and 50.0887723 Longitude, 26.146497 Latitude and 50.0895432 Longitude and 27.235129 Latitude and 53.456237 Longitude, respectively.

The at least one processor 134 identifies the geographical features of the geo-fenced area. The geographical features may include but not limited to the traffic information, type of area or location such as rural area or the urban area (residential), population density such as less population or heavy road users in between the two locations, traffic type or traffic load such as the HTV or the LTV. In an example, the at least one processor 134 may coordinate with the location-based service providers, for example, Google Maps or local servers in the geo-fenced areas capable of providing geographical features related information or any mapping-based service-providing organizations. In some examples, the at least one processor 134 may optionally obtain data or statistical information from publicly available data sources, or from proprietary data sources to identify the geographical features. In an example, an identified geographical feature at the $2^{nd}$ road frame is provided as:

Population type: Residential/Rural (high population)
Traffic load: Heavy traffic
Traffic type: peak hour traffic due to LTVs
GPS Location: 26.144497 Latitude and 50.0887723 Longitude.

The at least one processor 134 labels the identified geographical features. The labeling includes marking the pothole location coordinates, highlighting the road frames having the potholes, and the geographical features at the pothole location coordinates. The at least one processor 134 extracts the pothole features. The pothole features may include the average size of the potholes, the number of the potholes in the road frame as well as frequency of the potholes per kilometer length of the geo-fenced area. The at least one processor 134 may use image processing algorithms and/or machine learning techniques to extract pothole features. The at least one processor 134 may process the road frames using image processing algorithms and/or the machine learning algorithm. Considering the above example, the image processing algorithms or the machine learning algorithm may identify the number of the potholes in the $2^{nd}$ road frame. The image processing algorithm and/or the learning algorithm may count the number of potholes in $2^{nd}$ road frame by, for example, the matching the shape of the potholes with images of potholes. In an example, the $2^{nd}$ road frame may contain only one pothole. The processor 134 may save the count of potholes in road frame $2^{nd}$ as one pothole.

The processor 134 may process the $2^{nd}$ road frame using the image processing algorithm and/or the machine learning algorithm to identify the size/depth of the pothole. The image processing algorithm and/or machine learning algorithm may scan and perform the depth analysis of the road frame $2^{nd}$ using various image processing techniques and/or machine learning processes. The image processing techniques and/or machine learning techniques may identify the diameter/depth of the pothole. In an example, the depth/size of the pothole analyzed by the techniques is may be of small size. The processor 134 may save the size/shape of frames in road frame $2^{nd}$ as a small size pothole.

Further, the at least one processor 134 may apply the $2^{nd}$ road frame to the image processing algorithm and/or the machine learning algorithm to count the number of potholes per km distance. As one of the techniques may simply include to count the total number of potholes between the start location coordinate and the end location coordinate. In an example, the at least one processor 134 may identify ten potholes between the start location coordinate and the end location coordinate.

Using the pothole features as well as geographical features, the at least one processor 134 may proceed to determine the required repair action/recommendation for each pothole. In examples, the at least one processor 134 applies machine learning techniques to the extracted pothole features and the geographical features. In examples, the machine learning techniques may include, but are not limited to, a probabilistic classifier, such as a Naive Bayes classifier, a stochastic gradient descent, a K-nearest neighbor, a decision tree, a support vector machine and a random forest classifier. In an example, the classifier 132 may use a random forest classifier technique. The classifier 132 is configured to predict a class for repair action for the each identified pothole over the road surface. The procedure used by the random forest to identify the class is described in the examples below:

In an example, the identified geographical features and the pothole features at the $2^{nd}$ road frame for road surface is:
  Population type (Geographical feature): Residential/Rural
  Majority of traffic (Geographical feature): LTV
  Pothole size (pothole feature): Small
  Number of potholes in the frame (pothole feature): 1
  GPS Location: 26.144497 Latitude and 50.0887723 Longitude.

In an example, the identified geographical features and the pothole features at the $10^{th}$ road frame for road surface is:
  Population type (Geographical feature): Urban/diffused
  Majority of traffic (Geographical feature): HTV
  Pothole size (pothole feature): Small
  Number of potholes in the frame (pothole feature): 3
  GPS Location: 26.146497 Latitude and 50.0895432 Longitude The pothole features and the geographic features of three road frames (i.e., $2^{nd}$ and $10^{th}$ road frames) are provided as two inputs to the random forest classifier 132. The random forest classifier 132 selects random samples or data, that is, the pothole features and the geographical features as a training set. The classifier 132 constructs a decision tree for every sample of training data. The classifier 132 performs a voting step by averaging the decision tree. Finally, the classifier 132 selects the most voted prediction result as the final prediction result or class or decision for the road repair action/recommendation. An example is described below:

For the $2^{nd}$ road frame:
  Population type (Geographical feature): Residential; Majority traffic (Geographical feature): LTV; Pothole size (pothole feature): Small; Number of potholes in the frame (pothole feature): 1. GPS Location: 26.144497 Latitude and 50.0887723 Longitude.

Since the pothole size is small, the number of potholes is one, the population feature is residential, and the traffic type feature is LTV, there is a higher chance of an accident due to this pothole as the frequency of the LTV vehicles in a residential area may be high. Accordingly, classifier 132 may assign/predict a Class-2(High priority) to the road repair action/recommendation for the pothole identified in the $2^{nd}$ road frame.

For $10^{th}$ road frame:
  Population type (Geographical feature): Rural/diffused; Majority traffic (Geographical feature): HTV; Pothole size (pothole feature): Small; Number of potholes in the frame (pothole feature): 3. GPS Location: 26.146497 Latitude and 50.0895432 Longitude Since the pothole size is again small, the number of potholes are three, the population feature is rural and the traffic type feature is HTV, there is a possibility of a smaller number of vehicles near the location coordinate of the $10^{th}$ frame. However, there is a greater chance of an accident as the number of potholes is higher (three). Also the vehicles travelling on the rural roadway are of HTV type, with a higher likelihood of having an accident due to the multiple potholes. Accordingly, the classifier 132 may assign/predict a class-2 (Class-2: High priority) to the road repair action/recommendation to pothole identified in the $10^{th}$ road frame.

After predicting the classes for repair action/recommendation, the at least one processor 134 may store the classes for repair actions for each pothole(s) of the road surface-1 in the database 108. The real-time update regarding the pothole repair action/recommendation is initiated at the cloud server 104 so that it is further communicated to the concerned organization for remedial action regarding the repair process of the detected potholes. The concerned organization may be a corporation, road contractors, civil engineers or any government or private organizations tasked with the repair of the road. As such, the mentioned concerned/related organization may use a front-end interface 106 to access real-time update associated with the pothole repair process may be displayed.

The front-end interface 106, as shown in FIGS. 1A and 1B, is communicably connected to the cloud server 104. The front-end interface 106 includes a plurality of components such as the computer 136 and the display 138, to display the real-time or live progress and/or road repair action/recommendation for each pothole on the road surface. The computer 136 may have a graphics card such as NVIDIA GeForce RTX 3090 Ti DirectX, AMD Radeon RX 6950 XT DirectX, INTEL based graphics cards, or any graphic processing unit (GPU). The computer 136 may also have a hardware device capable to perform computing operation and run software algorithm related to display map, geofenced areas, information regarding the potholes or the like.

The hardware device of the computer 136 may be connected to the graphic card to display the data related to potholes efficiently.

The display 138 is operatively connected to the computer 136 using wired or wireless techniques. The display 138 may be a TFT screen, LCD display, LED display, a display of cellphone, mobile, IPOD, and any display device known in the art to display the road repair action/recommendation generated by the computer 136. The display 138 may have a touch screen capability or a peripheral device connectivity capability, for example, a mouse connected with the display 138 or with the computer 136. A user of the display 138 may interact through a touch screen-enabled user interface of the display 138 or use the mouse to click on the road repair action/recommendation on the user interface of the display 138 and view the real-time status of the pothole.

The front-end interface 106 may be connected to the cloud server 104 through the network using wired or wireless connections. The computer 136 is configured to generate the road repair recommendation for each pothole based on each class. The road repair recommendation may be visually provided on the display 138. In an example, the computer 136 generates a user interface view showing a map with road frames, coordinates of potholes, classes for each pothole, labels of the geographic features and the pothole features over the road frames of the potholes. The cloud server 104 transmits the classes appended with other data related to potholes to the front-end interface 106.

The front-end interface 106 receives the classes and the other data related to potholes. The computer 136 may access definitions associated with the recommended classes of the pothole repair process. For example, the definition of classes and their equivalent recommendation may be selected from the group consisting of immediate complete repair, immediate pothole/patching or patch repair, repair in next 6-8 months, and no repair required. The recommendation action may be defined as shown below:

Class 1—Extreme High priority—Definition: Immediate complete repair;
Class 2—High Priority—Definition: Immediate pothole/patch repair;
Class-3: Medium Priority—Definition: Repair in next 6-8 months; and
Class-4: Low priority—Definition: No repair required.

Once the classes and other data are received by the front-end interface 106, the computer 136 displays the classes assigned to each pothole. For example, pothole detected at $2^{nd}$ and $10^{th}$ road frame is assigned class 2 for road repair action/recommendation. Class 2 indicates immediate pothole/patch repair at location coordinates GPS Location: 26.144497 Latitude; Longitude as well as GPS Location: 26.146497 Latitude; 50.0895432 Longitude.

Similarly, the pothole detected at $10^{th}$ road frame was assigned Class 3 for road repair action/recommendation. Class 3 indicates repair in the next 6-8 months at location coordinates at GPS Location: 27.235129 Latitude and 53.456237 Longitude. Each data related to the pothole repair process is compiled by the computer 136 and is configured to display in a dialogue box 160 over the display 138, as discussed in FIG. 1D.

Figure 1D:
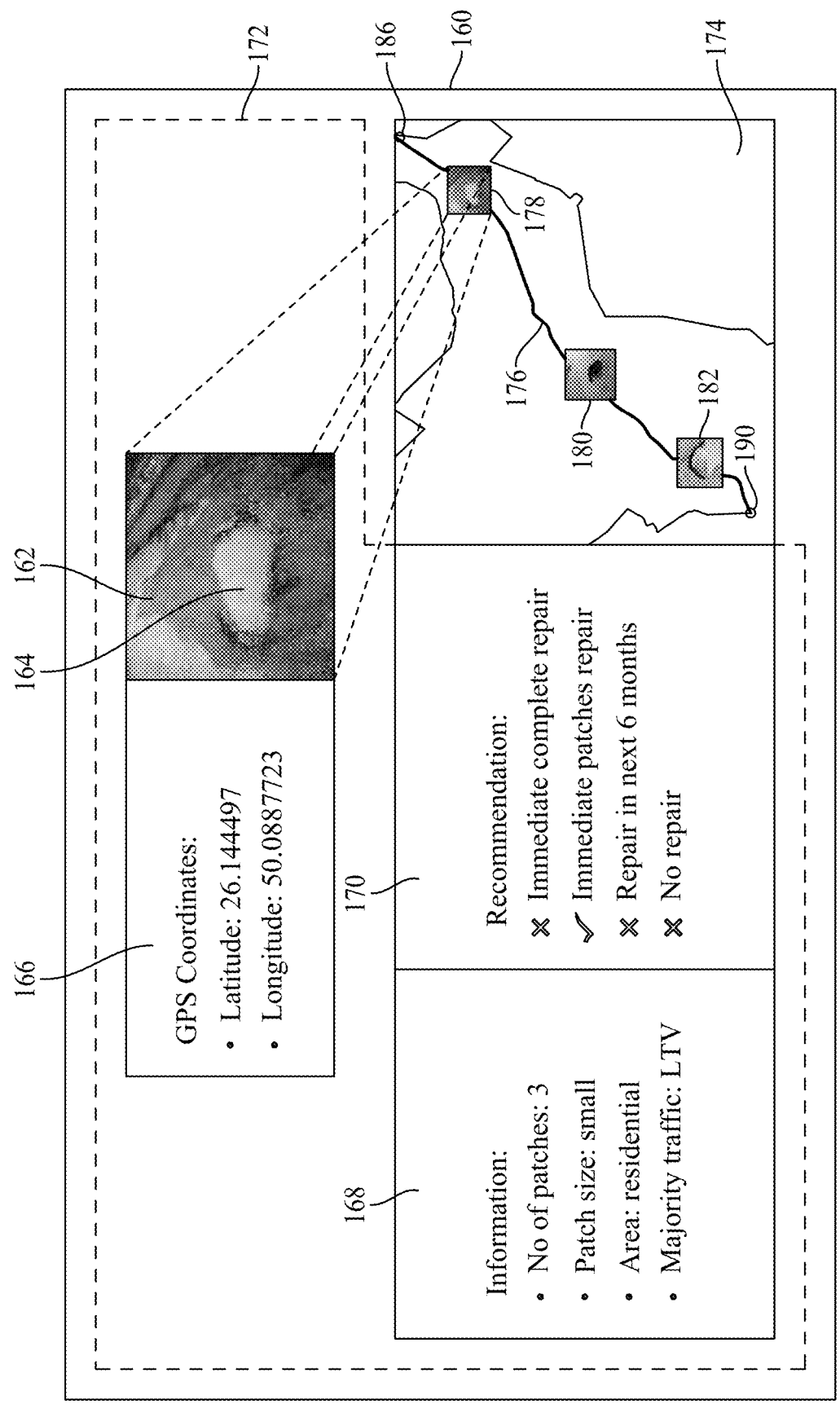
FIG. 1D is an exemplary illustration of visualization of a live map including location of pothole image, pothole location coordinates, information regarding pothole features and geographical features and suggested recommendations for repairing each pothole, according to certain embodiments.

FIG. 1D is an exemplary illustration of a front-end interface displaying a map including a location of a pothole, pothole location coordinates, information associated with pothole features and geographical features, and recommendations for repairing each pothole, according to an embodiment. The front-end interface accesses the cloud server 104 and generates a dialogue box 160 to display a map 174. The map 174 may display the roads with markers indicating potholes. A user can interact with the map and map elements. For example, the map may highlight a road and potholes when the user hovers a mouse pointer over the road. If the user hovers over the potholes, the front-end interface may provide a small window showing an image of the pothole, location coordinates of the pothole, information about the pothole, and road repair recommendations.

As indicated in the FIG. 1D, a road 176 with start location coordinate 186 and end location coordinate 190 is shown. The road 176 also shows a pothole 178, a pothole 180, and a pothole 182. In the figure, a user has selected or hovered over the pothole 178. In response, the front-end interface 106 displays location coordinates 166 of the pothole 178, an image 162 of the pothole 178, a feature 164 of the pothole 178 in a window. In addition, the front-end interface 106 provides information 168 of the pothole 178 that includes the number of pothole crater patches (3), patch size (small), geographical feature as area (residential), and traffic type (LTV). Also, the front-end interface 106 provides recommendation 170 to repair the pothole 178, which is immediate patch repair.

The organization managing the road maintenance work would have a real-time status of each pothole on the map. An employee user may click on any pothole image and get its real-time status regarding the pothole information, location, recommendations etc., and the concerned employee could take appropriate action to repair the road in a timely manner.

In an aspect, the user interface on the display 138 may include a "search option" on the user interface of the display 138 to locate "all potholes that require immediate complete repair" i.e., Class-1. The computer 136 displays a plurality of potholes such as 120 pothole on road surface-1 as, for example, a plurality of their road frames includes more than 2 potholes throughout the start and end location coordinates of the geo-fenced area where there are high chances of accident due to the pothole features and the geographical features near by the potholes coordinate. Such recommendation "immediate complete repair" may indicate a complete repair of the road surface, for example, in between the start location coordinate and the end location coordinate of the road surface. In an example, the geo-fenced area of a road surface-1 may be highlighted on the display 138 as soon the user searches for the same, indicating that the entire road surface-1 needs immediate complete repair.

In another aspect, the user may search for Class-2 repair option as "immediate patch/potholes repair" over the user interface on the display 138. The computer 136 displays plurality of potholes such as 3 potholes on road frame-3, 2 potholes on the road frame-4, 5 potholes on the road frame-6, etc., based upon their assigned classes by the cloud server 104. Such location coordinates of the potholes may be displayed on the display 138 when the user searches for the same.

In another aspect, the user may search for Class-3 repair option as "Repair in next 6-8 months". The computer 136 immediately displays plurality of potholes such as 7 potholes on road frame-2, 1 pothole on the road frame-3, 8 potholes on the road frame-4, etc. Such location coordinates of the potholes may be highlighted on the display 138 when the user searches for the same.

In a similar way, the user may search for Class-4 repair option as "No repair". In this case no pothole locations would be highlighted as it was ascertained by the cloud server 104 and/or the UAVs that such pothole locations need no repair.

Accordingly, the front-end interface 106 provides prioritized location coordinates of the potholes based on their assigned repair recommendation class, along with their geographical features and the pothole features through the front-end interface 106. The road repair authorities thus receive a highly accurate prioritized location of potholes that require immediate attention. The road repair authorities also receive a highly accurate prioritize location of potholes that do not require immediate repair, and which can be repaired within 6-8 months. The front-end interface 106 displays such road surfaces which require a high level of attention to repair the complete road due to the detection of too many potholes in the entire section between the start and end location of the road surface. The concerned road repair authorities may accordingly repair the potholes based on their assigned class in a timely manner. Also, each of the UAVs 102 may be programmed to automatically scan the respective road surfaces at a certain interval, such as 1 week or a month, and deliver the status report to the cloud server automatically in a timely manner to update the current status of each pothole. Updating the current status may be shown on the map on the display of the front-end interface 106.

Figure 2:
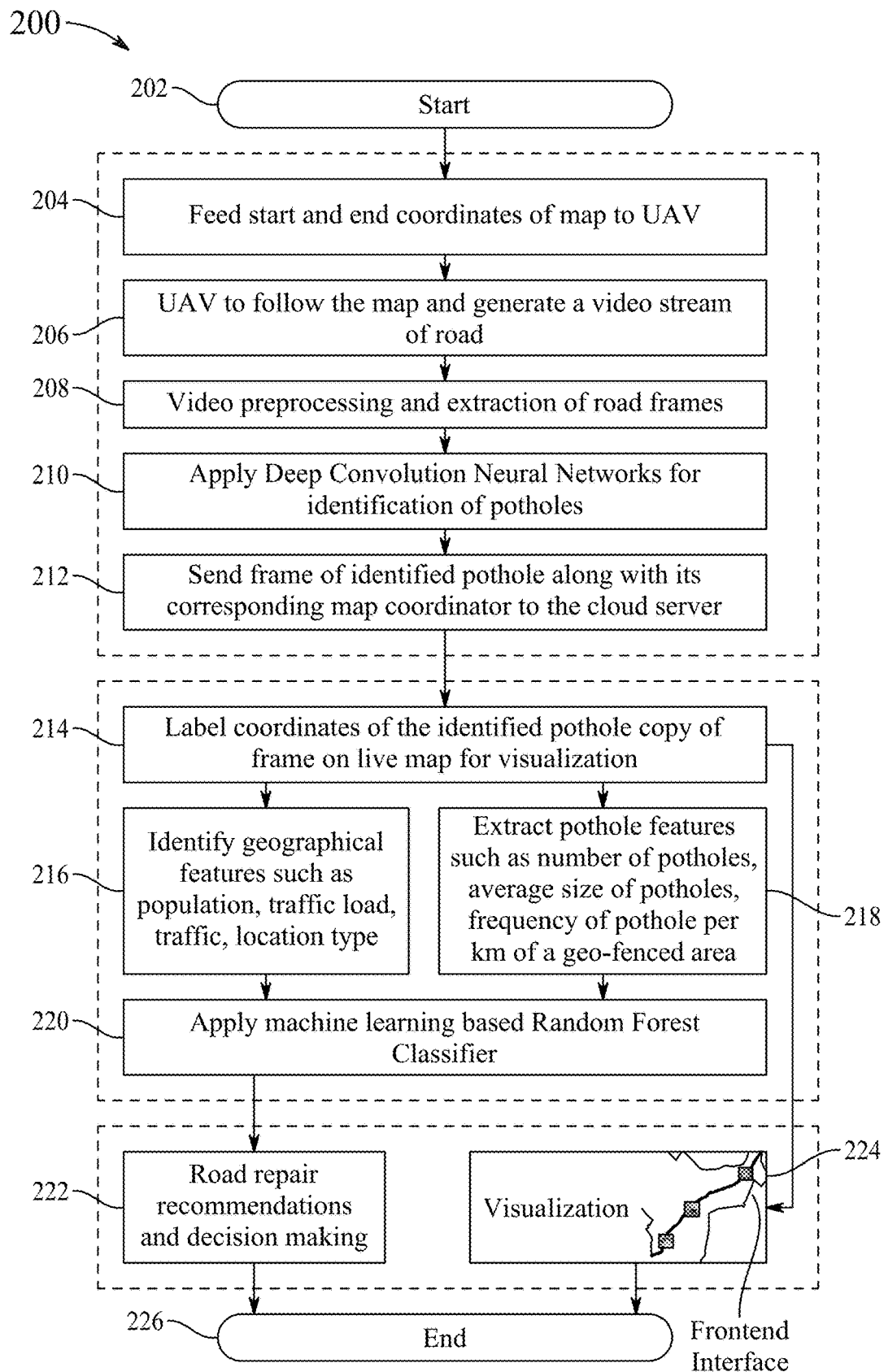
FIG. 2 illustrates a flowchart of autonomous pothole detection and road repair determination, according to certain embodiments.

FIG. 2 illustrates a flowchart 200 for pothole monitoring and repair of the road surface. The flowchart 200 is described in conjunction with FIG. 1A-FIG. 1D. For simplicity, the flowchart is explained with respect to one UAV, which can be equally applied to other UAVs 102.

Steps 202-212 are performed by the UAV 102, and steps 214-220 are performed by the cloud server 104.

Step 202 includes initiating the UAV 102 for scanning a road surface.

Step 204 includes feeding a start location coordinate and end location coordinate of road surfaces to the UAV 102. In an example, the start location coordinate and end location coordinate may be fed via wired or wireless units communicatively coupled to the UAVs 102.

The UAV 102 traverses the assigned road from the start location coordinate to the end location coordinate and generates video streams of the road surfaces in step 206. The UAV 102 is equipped with a video camera 114 to generate a video stream of a plurality of road surfaces. In an aspect the video camera 114 may be configured to automatically adjust its field of view to capture at least a portion of the road surface beneath and/or ahead of the UAV 102.

Step 208 includes processing, by the video processor, the video stream and extracting road frames from the video stream. In an example, the road frames may refer to images of the road surface extracted from the video streams.

Step 210 includes applying the DCNN on the road frames for identification of potholes. In an example, the computing unit 118 of the UAV 102 utilizes the global positioning receiver 112 to generate a geo-fenced area of the road surface. The DCNN 120 includes a plurality of layer of neural networks to learn and analyze the road frames within the geo-fenced area of the road surface to identify pothole(s) as described above. The computing unit 118 generates a communication packet including the road frames, the location coordinates of each of the road frames, and the pothole(s) identified in the road frames.

Step 212 includes communicating the communication packet to the cloud server 104. The cloud server 104 includes at least one processor 134 that generates a map of the geo-fenced area of the road surface.

Step 214 includes labeling, by the at least one processor 134, the location coordinates of each identified pothole on the map. In an example, the labeled location coordinates of each pothole may be visualized live on the map. Step 216 includes identifying geographical features in the road frames within the geo-fenced area, such as population, traffic load, traffic type, location type, etc.

Step 218 includes extracting, by the at least one processor 134, pothole features such as the number of potholes within each road frame, an average size of the potholes, and the frequency of potholes per kilometer of the geo-fenced area. In order to extract the potholes features, the processor 134 may use image processing algorithms and/or a machine learning techniques.

Step 220 includes applying, by the at least one processor 134, the machine learning algorithm such as a random forest classifier on the pothole features and geographical features to predict classes for repair actions. The random forest classifier 132 predicts the corresponding class for repair action for each identified pothole over the road surface.

Step 222 includes providing, by the at least one processor 134, road repair recommendations based on the predicted classes for repair actions and decision-making step to the front-end interface 106. Step 224 includes generating and providing visualization of the pothole repair process on a display of a front-end interface 106 communicably connected to the cloud server 104. The front-end interface 106 includes a computing device operatively connected to a display 138. In an example, the computing device may be a computer 136, laptop, mobile device, personal digital assistant (PDA) or any custom device for road repair operations. The visualization may incorporate the road repair recommendation for each pothole based on each class identified by the cloud server 104. In some examples, the road repair recommendations may be shown alongside the pothole. In some examples, the road repair recommendations may be hidden and may be displayed when a pointer is hovered over the pothole on the map. The visualization may display the real-time progress or live progress along with road repair action/recommendation for each pothole on the road surface. At step 226, the flowchart 200 is terminated.

Embodiments of the disclosure are illustrated with respect to FIG. 1A to FIG. 2. The embodiments describe an autonomous pothole monitoring and repair determination system 100 for a road surface. The autonomous pothole monitoring and repair determination system 100 includes a plurality of autonomous unmanned aerial vehicles (UAVs 102) 102, wherein each UAV 102 is equipped with a video camera 114, a video processor 116, a computing unit 118 and a global positioning receiver 112. Each global positioning receiver 112 is configured to provide the location coordinates of the UAV 102. Each video camera 114 is configured to generate video streams of a plurality of road surfaces. Each video processor 116 is configured to preprocess and extract road frames from the video streams. Each computing unit 118 is configured to utilize the global positioning receiver 112 to generate a geo-fenced area of the road surface, and determine whether there is at least one pothole in each of road frames within the geo-fenced area, generate a communication packet including road frames, the location coordinates of each of road frames and the potholes identified in road frames and transmit the communication packet. A cloud server 104 is communicably connected to each of the UAVs 102 to receive the communication packet, wherein the cloud server 104 includes a computing circuitry 124, a memory 126 including program instructions, a classifier 132 and at least one processor 134 configured to use the program instructions to generate a map of the geo-fenced area of the road surface, label the location coordinates of each pothole on the map, identify geographical features in road frames within the geo-fenced area, wherein the geographical features include any one of population, traffic load, traffic type, and location type, label the geographical features on the map, extract pothole features including a number of the potholes within each road frame, an average size of the potholes, and a frequency of a pothole occurrence per kilometer of the geo-fenced area, apply the pothole features and geographical features to the classifier 132, wherein the classifier 132 is configured to predict classes for repair actions. A front-end interface 106 is communicably connected to the cloud server 104, wherein the front-end interface 106 includes a computer 136 operatively connected to a display 138, wherein the computer 136 is configured to generate road repair recommendations for each pothole based on each class; and provide visualization of a pothole repair process on the display 138.

In an aspect, the system 100 uses a random forest classifier.

In an aspect, a database 108 is operatively connected to the cloud server 104, wherein the cloud server 104 is configured to store the road frames, the location coordinates of each of the road frames, the potholes identified in the road frames, the geographical features, and the pothole features in the database 108.

In an aspect, a map generator 110 is operatively connected to the cloud server 104, wherein the map generator 110 is configured to generate the map of the geo-fenced area of the road surface.

In an aspect, the geo-fenced area includes a set of start location coordinates, a set of end location coordinates, and a section of the road surface between the start location coordinates and the end location coordinates.

In an aspect, the visualization includes an image of each road frame including at the least one pothole, first graphics including the location coordinates of the road frame including at the least one pothole, the number of potholes within each road frame, the average size of each pothole, the frequency of the pothole occurrence per kilometer of the geo-fenced area, the population, traffic load, traffic type and location type, and second graphics including a recommendation for the repair action of each pothole, a schedule for repairing each pothole, and a status of the repair of each pothole.

In an aspect, the recommendation for the repair action is selected from the group consisting of: immediate complete repair, immediate patching, repair within 6 months, and no repair.

In an aspect, the computing unit 118 includes a deep convolutional neural network 120, wherein the deep convolutional neural network 120 is trained to identify any potholes in each road frame.

In an aspect, the deep convolutional neural network 120 includes a plurality of layers comprising: an input layer 142 configured to receive each road frame and its location coordinates, and zero pad each road frame to normalize its size. A first convolution and ReLU layer 144 is connected to the input layer 142, wherein the first convolution and ReLU layer 144 is configured to search each road frame and generate a feature map of each road frame. A first pooling layer 146 is connected to the first convolution and ReLU layer 144, wherein the first pooling layer 146 is configured to downsample the feature maps. A second convolution and ReLU layer 148 is connected to the first pooling layer 146, wherein the second convolution and ReLU layer 148 is configured to calculate a weighted sum of each feature map and decide whether to retain or discard the feature map. A second pooling layer 150 is connected to the second convolution and ReLU layer, wherein the second pooling layer 150 is configured to downsample the retained feature maps. A dropout layer 152 is connected to the second pooling layer 150, wherein the dropout layer 152 is configured to remove selected columns in the retained feature maps. A flattening layer 154 is connected to the dropout layer 152, wherein the flattening layer 154 is configured to convert the retained feature maps with selected columns removed to a single dimensional linear vector. A dense layer 156 is connected to the flattening layer154, wherein the dense layer 156 is configured to connect each feature of a retained feature map to a respective feature of an adjacent previous retained feature map. A softmax layer 158 is connected to the dense layer 156, wherein the softmax layer 158 is configured to convert the single dimensional linear vector to a probability density function and determine whether there is a pothole or no pothole in the single dimensional linear vector.

In an aspect, a method for pothole monitoring and repair of a road surface overflown by a plurality of autonomous unmanned aerial vehicles (UAVs 102) 102, includes generating, by a global positioning receiver 112 located in each UAV 102, location coordinates of the respective UAV 102; generating, by the global positioning receiver 112 in a respective UAV 102, a geo-fenced area of the road surface beneath the respective UAV 102; generating, by a video camera 114 located in the respective UAV 102, a set of video streams of the geo-fenced area beneath each respective UAV 102; preprocessing, by a video processor 116 connected to the video camera 114, the set of video streams of the geo-fenced area; extracting, by the video processor 116, a set of road frames from the set of video streams; determining, by a computing unit 118 located in each UAV 102 operatively connected to the video processor 116, whether there is at least one pothole in each set of road frames within the geo-fenced area; generating, by the computing unit 118, a communication packet including the set of road frames, the location coordinates of each of the road frames and potholes identified in each road frame; transmitting, by the computing unit 118, the communication packet to a cloud server 104; receiving, by the cloud server 104, the communication packet; wherein the cloud server 104 includes a computing circuitry 124, a memory 126 including program instructions, a classifier 132 and at least one processor 134 configured to use the program instructions for: generating a map of the geo-fenced area of the road surface; labelling the location coordinates of each pothole on the map; identifying geographical features in the road frames within the geo-fenced area, wherein the geographical features include any one of population, traffic load, traffic type, and location type; labelling the geographical features on the map; extracting pothole features including a number of the potholes within each road frame, an average size of the potholes, and a frequency of a pothole occurrence per kilometer of the geo-fenced area; applying the pothole features and geographical features to the classifier 132, wherein the classifier 132 is configured to predict classes for repair actions; receiving, by a front-end interface 106 communicably connected to the cloud server 104, the classes, and the map, wherein the front-end interface 106 includes a computer 136 operatively connected to a display 138, wherein the computer 136 is configured for: generating road repair recommendations for each pothole based on each class; and providing visualization of a pothole repair process on the display 138.

In an aspect, the classifier is a random forest classifier.

In an aspect, the method includes storing, in a database 108 operatively connected to the cloud server 104, the road frames, the location coordinates of each of the road frames, the potholes identified in road frames, the geographical features, and pothole features.

In an aspect, the method includes generating, with a map generator 110 operatively connected to the cloud server 104, the map of the geo-fenced area of the road surface, wherein the geo-fenced area includes a set of start location coordinates, a set of end location coordinates, and a section of the road surface between the start location coordinates 186 and the end location coordinates 190.

In an aspect, the visualization includes an image of each road frame includes at the least one pothole, first graphics including the location coordinates of the road frame including at the least one pothole, the number of potholes within each road frame, the average size of each pothole, the frequency of the pothole occurrence per kilometer of the geo-fenced area, the population, traffic load, traffic type and location type, and second graphics including a recommendation for the repair action of each pothole, a schedule for repairing each pothole, and a status of the repair of each pothole.

In an aspect, the method includes selecting, by the computer 136 of the front-end interface 106, the repair action from the group consisting of: immediate complete repair, immediate patching, repair within 6 months, and no repair.

In an aspect, the method includes applying, by the computing unit 118 of each UAV 102, each of the road frames in the geo-fenced area to a deep convolutional neural network 120 trained to identify any potholes in each of the road frames.

In an aspect, the method includes receiving, by an input layer 142 of the deep convolutional neural network 120, each road frame and its location coordinates; zero padding, by the input layer, each road frame to normalize its size; searching, by a first convolution and ReLU layer 144 connected to the input layer 142, each road frame and generating a feature map of each road frame; downsampling, by a first pooling layer 146 connected to the first convolution and ReLU layer 144, the feature maps; calculating, by a second convolution and ReLU layer 148 connected to the first pooling layer 146, a weighted sum of each feature map and deciding whether to retain or discard the feature map; downsampling, by a second pooling layer 150 connected to the second convolution and ReLU layer 148, the retained feature maps; removing, by a dropout layer 152 connected to the second pooling layer 150, selected columns in the retained feature maps; converting, by a flattening layer 154 connected to the dropout layer 152, the retained feature maps with selected columns removed to a single dimensional linear vector; connecting, by a dense layer 156 connected to the flattening layer 154, each feature of a retained feature map to a respective feature of an adjacent previous retained feature map; and converting, by a softmax layer 158 connected to the dense layer 156, the single dimensional linear vector to a probability density function and determining whether there is a pothole or no pothole in the single dimensional linear vector.

In an aspect, a non-transitory computer readable medium having first instructions stored therein that, when executed by one or more first processors, cause the one or more first processors to perform a method for pothole monitoring and repair of a road surface overflown by a plurality of autonomous unmanned aerial vehicles (UAVs) 102, comprising: generating, by a global positioning receiver 112 located in each UAV 102, location coordinates of the respective UAV 102; generating, by the global positioning receiver 112 in a respective UAV 102, a geo-fenced area of the road surface beneath the respective UAV 102; generating, by a video camera 114 located in the respective UAV 102, a set of video streams of the geo-fenced area beneath each respective UAV 102; preprocessing, by a video processor 116 connected to the video camera 114, the set of video streams of the geo-fenced area; extracting, by the video processor 116, a set of road frames from the set of video streams; determining, by the one or more first processors, whether there is at least one pothole in each set of road frames within the geo-fenced area; and generating a communication packet including the set of road frames, the location coordinates of each of the road frames and the potholes identified in each of the road frames.

In an aspect, the non-transitory computer readable medium method includes transmitting the communication packet to a cloud server 104; receiving, by the cloud server 104, the communication packet, wherein the cloud server 104 includes a computing circuitry 124 including a second non-transitory computer readable medium, a memory 126 including second program instructions, a classifier 132 and at least one second processor 134 configured to use the second program instructions for generating a map of the geo-fenced area of the road surface; labelling the location coordinates of each pothole on the map; identifying geographical features in the road frames within the geo-fenced area, wherein the geographical features include any one of population, traffic load, traffic type, and location type; labelling the geographical features on the map; extracting pothole features including a number of the potholes within each road frame, an average size of the potholes, and a frequency of a pothole occurrence per kilometer of the geo-fenced area; applying the pothole features and geographical features to the classifier 132, wherein the classifier 132 is configured to predict classes for repair actions; and predicting the classes for repair actions.

In an aspect, the non-transitory computer readable medium method comprising receiving, by a front-end interface 106 communicably connected to the cloud server 104, the classes, and the map, wherein the front-end interface 106 includes a computer 136 operatively connected to a display 138, wherein the computer 136 is configured for generating road repair recommendations for each pothole based on each class and providing visualization of a pothole repair process on the display 138.

Figure 3:
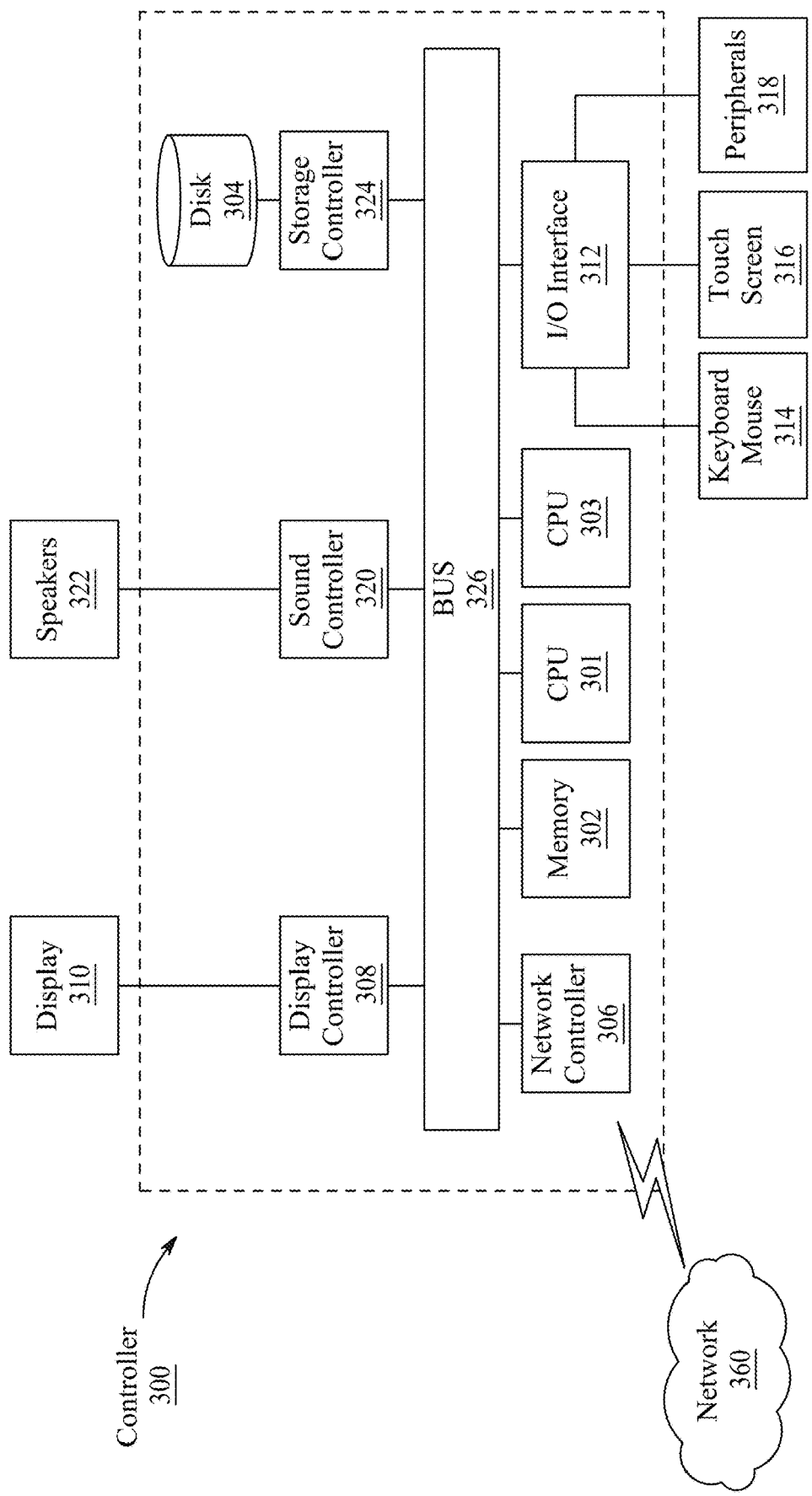
FIG. 3 is an illustration of a non-limiting example of details of computing hardware used in the computing system, according to aspects of the present disclosure.

Next, further details of the hardware description of the computing environment of FIG. 1 according to exemplary embodiments are described with reference to FIG. 3. In FIG. 3, the computing circuitry 125 of FIG. 1 is a computing device which includes a CPU 61 which performs the processes described above/below. FIG. 3 is an illustration of a non-limiting example of details of computing hardware used in the computing system, according to exemplary aspects of the present disclosure. The process data and instructions may be stored in memory 62. These processes and instructions may also be stored on a storage medium disk 64 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 61, 63 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 61 or CPU 63 may be a Xenon or Core processor from Intel of America or an Opteron processor from AMD of America, or may be other processor types that would be recognized by one of ordinary skill in the art. Alternatively, the CPU 61, 63 may be implemented on an FPGA, ASIC, PLD or using discrete logic circuits, as one of the ordinary skill in the art would recognize. Further, CPU 61, 63 may be implemented as multiple processors cooperatively working in parallel to perform the instructions of the inventive processes described above.

The computing device in FIG. 3 also includes a network controller 66, such as an Intel Ethernet PRO network interface card from Intel Corporation of America, for interfacing with network 360. As can be appreciated, the network 360 can be a public network, such as the Internet, or a private network such as an LAN or WAN network, or any combination thereof and can also include PSTN or ISDN subnetworks. The network 360 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 68, such as a NVIDIA GeForce GTX or Quadro graphics adaptor from NVIDIA Corporation of America for interfacing with display 310, such as a Hewlett Packard HPL2445w LCD monitor. A general purpose I/O interface 312 interfaces with a keyboard and/or mouse 314 as well as a touch screen panel 316 on or separate from display 310. General purpose I/O interface also connects to a variety of peripherals 318 including printers and scanners, such as an OfficeJet or DeskJet from Hewlett Packard.

A sound controller 320 is also provided in the computing device such as Sound Blaster X-Fi Titanium from Creative, to interface with speakers/microphone 322 thereby providing sounds and/or music.

The general-purpose storage controller 324 connects the storage medium disk 64 with communication bus 326, which may be an ISA, EISA, VESA, PCI, or similar, for interconnecting all of the components of the computing device. A description of the general features and functionality of the display 310, keyboard and/or mouse 314, as well as the display controller 68, storage controller 324, network controller 66, sound controller 320, and general purpose I/O interface 312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 4.

Figure 4:
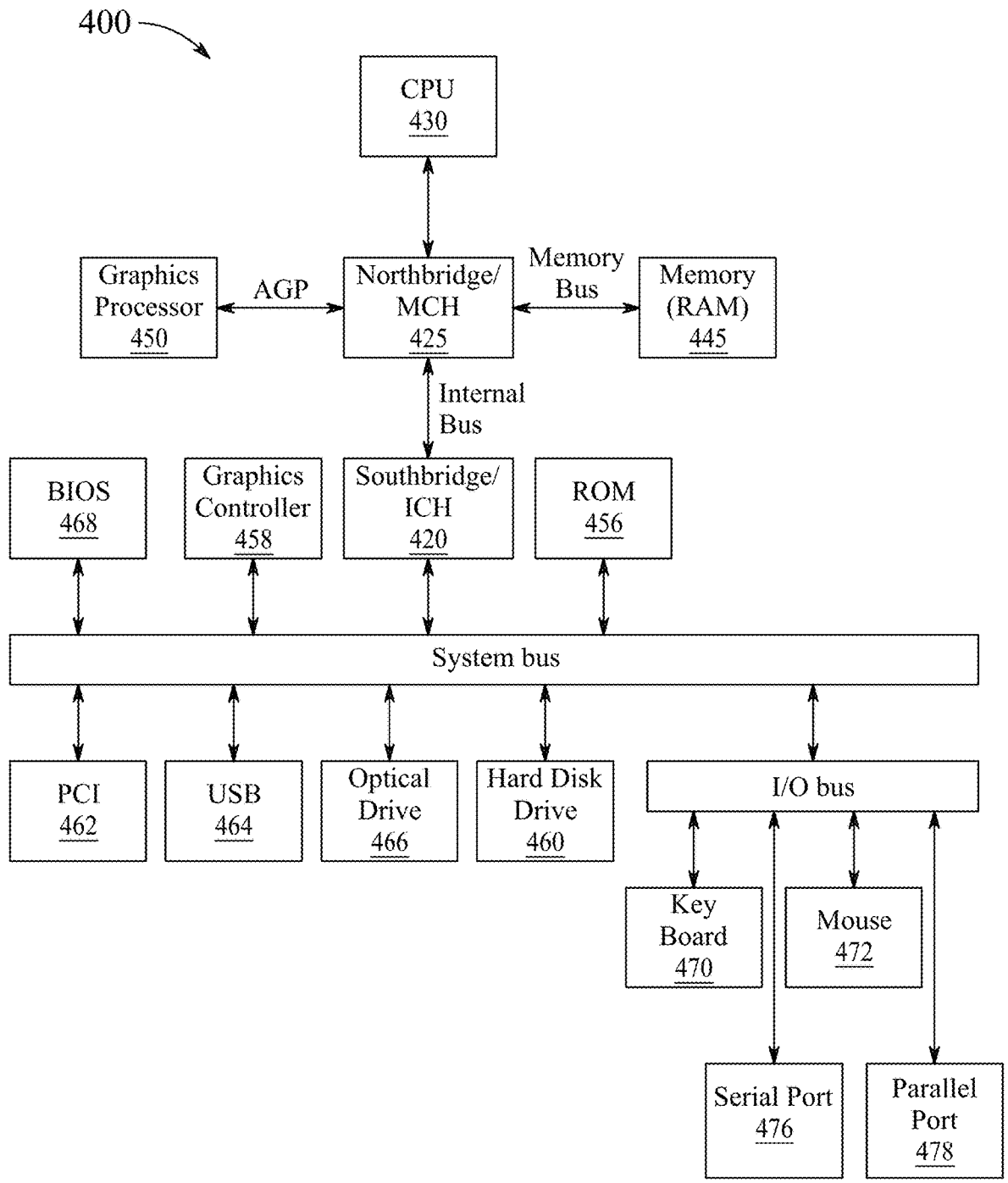
FIG. 4 is an exemplary schematic diagram of a data processing system used within the computing system, according to aspects of the present disclosure.

FIG. 4 shows a schematic diagram of a data processing system 400 used within the computing system, according to exemplary aspects of the present disclosure. The data processing system 400 is an example of a computer in which code or instructions implementing the processes of the illustrative aspects of the present disclosure may be located. In FIG. 4, data processing system 480 employs a hub architecture including a north bridge and memory controller hub (NB/MCH) 425 and a south bridge and input/output (I/O) controller hub (SB/ICH) 420. The central processing unit (CPU) 430 is connected to NB/MCH 425. The NB/MCH 425 also connects to the memory 445 via a memory bus, and connects to the graphics processor 450 via an accelerated graphics port (AGP). The NB/MCH 425 also connects to the SB/ICH 420 via an internal bus (e.g., a unified media interface or a direct media interface).

The CPU Processing unit 430 may contain one or more processors and even may be implemented using one or more heterogeneous processor systems.

Figure 5:
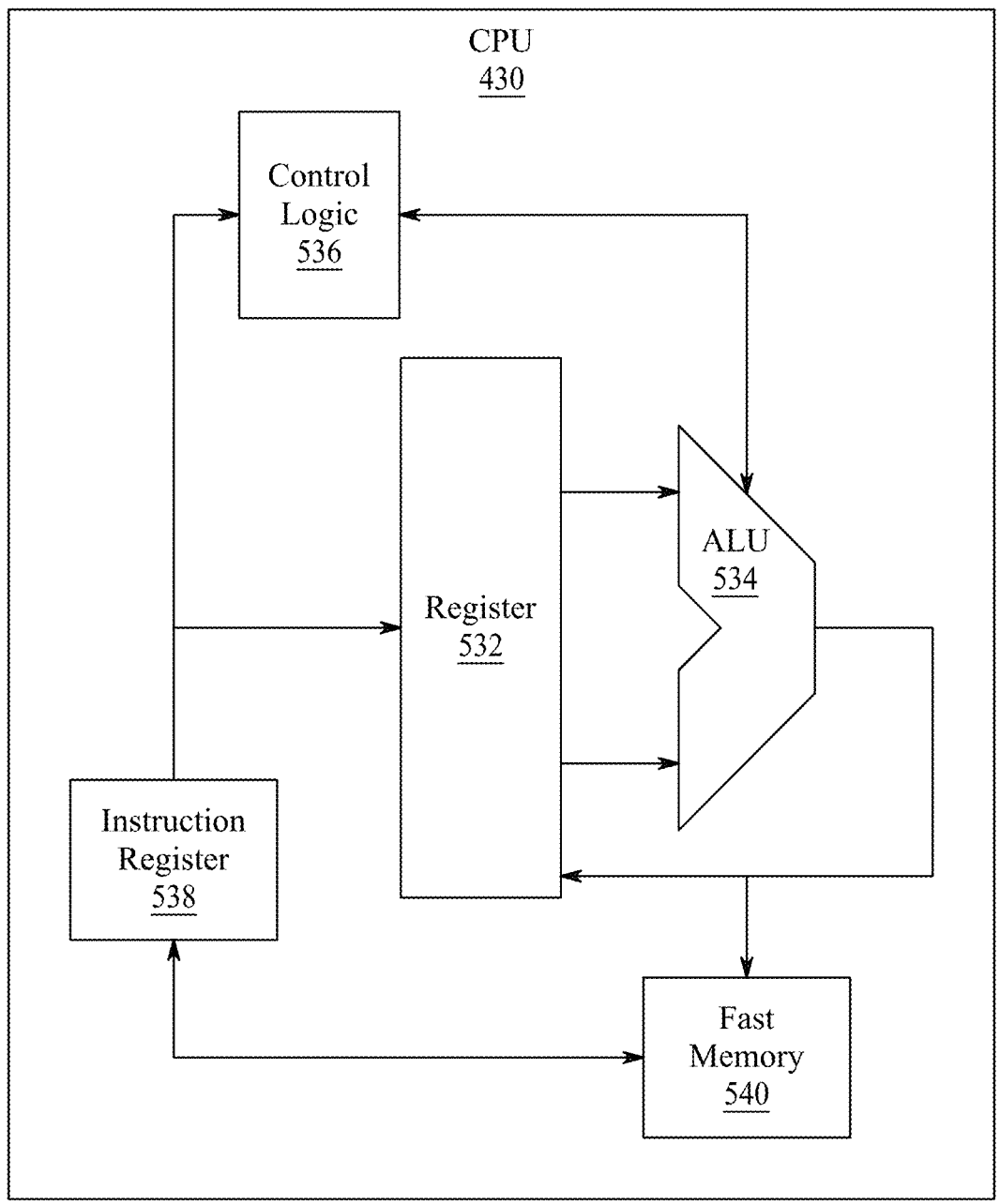
FIG. 5 is an exemplary schematic diagram of a processor used with the computing system, according to aspects of the present disclosure.

For example, FIG. 5 shows one aspects of the present disclosure of CPU 430. In one aspects of the present disclosure, the instruction register 538 retrieves instructions from the fast memory 540. At least part of these instructions is fetched from the instruction register 538 by the control logic 536 and interpreted according to the instruction set architecture of the CPU 430. Part of the instructions can also be directed to the register 532. In one aspects of the present disclosure the instructions are decoded according to a hardwired method, and in another aspect of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 534 that loads values from the register 532 and performs logical and mathematical operations on the loaded values according to the instructions. The results from these operations can be feedback into the register and/or stored in the fast memory 540. According to certain aspects of the present disclosures, the instruction set architecture of the CPU 430 can use a reduced instruction set architecture, a complex instruction set architecture, a vector processor architecture, a very large instruction word architecture. Furthermore, the CPU 430 can be based on the Von Neuman model or the Harvard model. The CPU 430 can be a digital signal processor, an FPGA, an ASIC, a PLA, a PLD, or a CPLD. Further, the CPU 430 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 4, the data processing system 480 can include that the SB/ICH 420 is coupled through a system bus to an I/O Bus, a read only memory (ROM) 456, universal serial bus (USB) port 464, a flash binary input/output system (BIOS) 468, and a graphics controller 458. PCI/PCIe devices can also be coupled to SB/ICH 420 through a PCI bus 462.

The PCI devices may include, for example, Ethernet adapters, add-in cards, and PC cards for notebook computers. The Hard disk drive 460 and CD-ROM 456 can use, for example, an integrated drive electronics (IDE) or serial advanced technology attachment (SATA) interface. In one aspect of the present disclosure the I/O bus can include a super I/O (SIO) device.

Further, the hard disk drive (HDD) 460 and optical drive 466 can also be coupled to the SB/ICH 420 through a system bus. In one aspects of the present disclosure, a keyboard 470, a mouse 472, a parallel port 478, and a serial port 476 can be connected to the system bus through the I/O bus. Other peripherals and devices that can be connected to the SB/ICH 420 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 6:
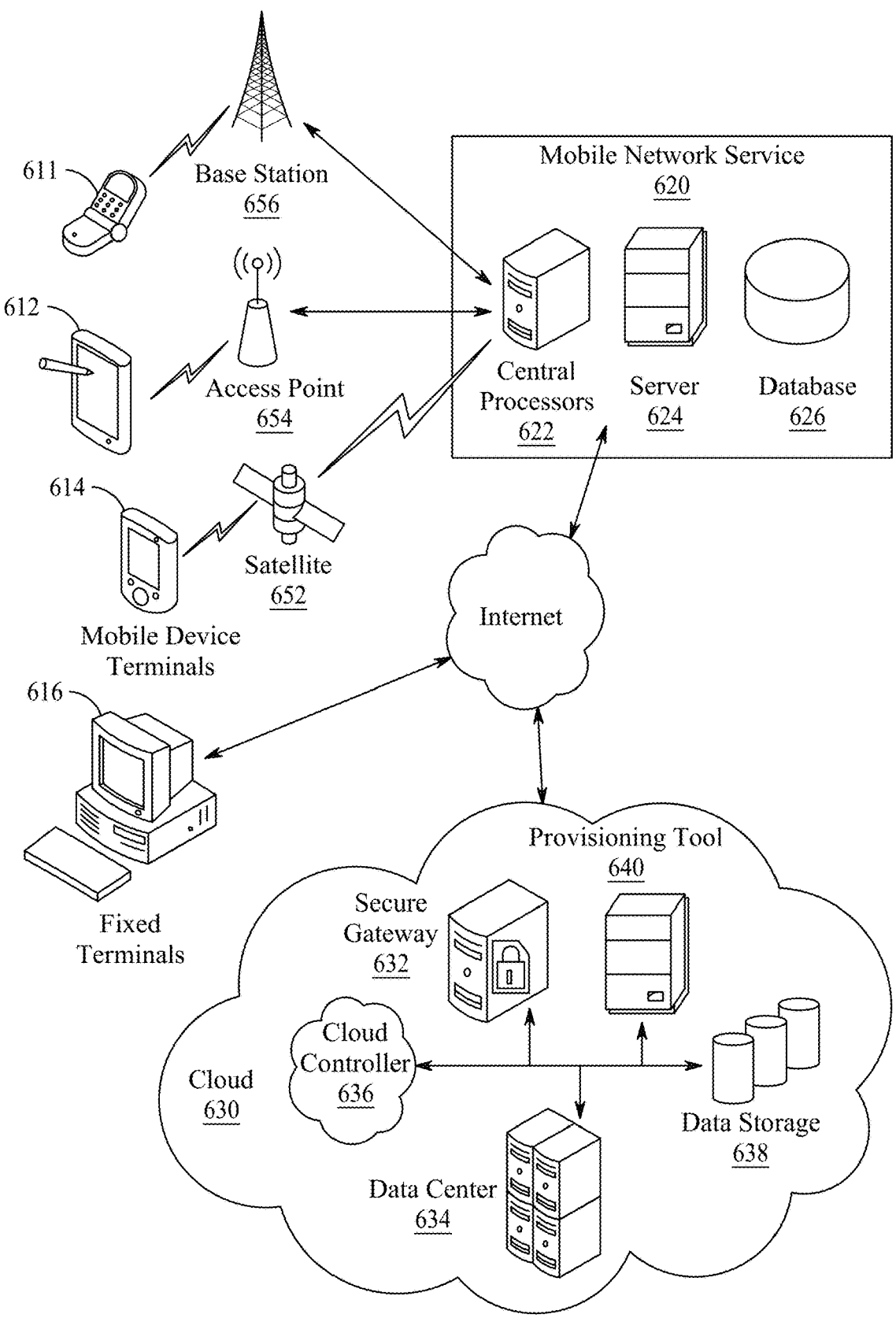
FIG. 6 is an illustration of a non-limiting example of distributed components that may share processing with the controller, according to aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 6, in addition to various human interface and communication devices (e.g., display monitors, smart phones, tablets, personal digital assistants (PDAs)). More specifically, FIG. 6 illustrates client devices including smart phone 611, tablet 612, mobile device terminal 614 and fixed terminals 616. These client devices may be commutatively coupled with a mobile network service 620 via base station 656, access point 654, satellite 652 or via an internet connection. Mobile network service 620 may comprise central processors 622, server 624 and database 626. Fixed terminals 616 and mobile network service 620 may be commutatively coupled via an internet connection to functions in cloud 630 that may comprise security gateway 632, data center 634, cloud controller 636, data storage 638 and provisioning tool 640. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

Obviously, numerous modifications and variations of the present disclosure are possible in light of the above teachings. For example, each UAV may have a laser, radar, sonar or infrared-based scanning technique for scanning the plurality of roads, apart from using the video camera. Further, only one UAV may be configured to scan all road surface of a specific geographical area instead of using plurality of UAVs as far as cost cutting is concerned. Also, machine learning techniques (DCNN) are implemented on the UAV as well as on the cloud server (random forest), respectively. In a possible modification, both machine learning techniques may be implemented on the UAV itself such that the UAV may be configured to perform all computations and directly report to the front-end interface and hence removing the need of cloud server. In another possible modification, both machine learning techniques may be implemented on the cloud server only, such that the UAV may be configured to perform road monitoring and sharing video streams. Therefore, there are plethora of modifications that can be introduced while describing or practicing the invention. It is therefore to be understood that within the scope of the appended claims, the invention may be practiced otherwise than as specifically described herein.

The invention claimed is:

1. A pothole monitoring and repair system for a road surface, comprising:
a plurality of autonomous unmanned aerial vehicles (UAVs), wherein each UAV is equipped with a video camera, a video processor, computing unit and a global positioning receiver, wherein:
each global positioning receiver is configured to provide location coordinates of the UAV;
each video camera is configured to generate video streams of a plurality of road surfaces;
each video processor is configured to preprocess and extract road frames from the video streams;
each computing unit is configured to utilize the global positioning receiver to generate a geo-fenced area of the road surface, determine whether there is at least one pothole in each of the road frames within the geo-fenced area, and generate a communication packet including the road frames, the location coordinates of each of the road frames and any potholes identified in the road frames and transmit the communication packet;
a cloud server communicably connected to each of the UAVs to receive the communication packet, wherein the cloud server includes a computing circuitry, a memory including program instructions, a classifier and at least one processor configured to use the program instructions to:
generate a map of the geo-fenced area of the road surface;
label the location coordinates of each pothole on the map;
identify geographical features in the road frames within the geo-fenced area, wherein the geographical features include population, traffic load, traffic type, and location type;
label the geographical features on the map;
extract pothole features including a number of the potholes within each road frame, an average size of the potholes, and a frequency of a pothole occurrence per kilometer of the geo-fenced area;
apply the pothole features and geographical features to the classifier, wherein the classifier is configured to predict classes for repair actions;
predict the classes for repair actions, each of the predicted classes being based on a combination of the pothole features and the geographical features;
a front-end interface communicably connected to the cloud server, wherein the front-end interface includes a computer operatively connected to a display, wherein the computer is configured to:
generate road repair recommendations for each pothole based on each class; and
provide visualization of a pothole repair process on the display.

2. The pothole repair system of claim 1, wherein the classifier is a random forest classifier.

3. The pothole repair system of claim 1, further comprising:
a database operatively connected to the cloud server, wherein the cloud server is configured to store the road frames, the location coordinates of each of the road frames, the potholes identified in the road frames, the geographical features, and the pothole features in the database.

4. The pothole repair system of claim 1, further comprising:
a map generator operatively connected to the cloud server, wherein the map generator is configured to generate the map of the geo-fenced area of the road surface.

5. The pothole repair system of claim 4, wherein the geo-fenced area includes a set of start location coordinates, a set of end location coordinates, and a section of the road surface between the start location coordinates and the end location coordinates.

6. The pothole repair system of claim 1, wherein the visualization includes an image of each road frame including at the least one pothole, first graphics including the location coordinates of the road frame including at the least one pothole, the number of potholes within each road frame, the average size of each pothole, the frequency of the pothole occurrence per kilometer of the geo-fenced area, the population, traffic load, traffic type and location type, and second graphics including a recommendation for the repair action of each pothole, a schedule for repairing each pothole, and a status of the repair of each pothole.

7. The pothole repair system of claim 6, wherein the recommendation for the repair action is selected from the group consisting of: immediate complete repair, immediate patching, repair within 6 months, and no repair.

8. The pothole repair system of claim 1, wherein the computing unit includes a deep convolutional neural network, wherein the deep convolutional neural network is trained to identify any potholes in each of the road frames.

9. The pothole repair system of claim 8, wherein the deep convolutional neural network includes a plurality of layers comprising:
an input layer configured to receive each road frame and its location coordinates, and zero pad each road frame to normalize its size;
a first convolution and ReLU layer connected to the input layer, wherein the first convolution and ReLU layer is configured to search each road frame and generate a feature map of each road frame;
a first pooling layer connected to the first convolution and ReLU layer, wherein the first pooling layer is configured to downsample the feature maps;
a second convolution and ReLU layer connected to the first pooling layer, wherein the second convolution and ReLU layer is configured to calculate a weighted sum of each feature map and decide whether to retain or discard the feature map;
a second pooling layer connected to the second convolution and ReLU layer, wherein the second pooling layer is configured to downsample the retained feature maps;
a dropout layer connected to the second pooling layer, wherein the dropout layer is configured to remove selected columns in the retained feature maps;
a flattening layer connected to the dropout layer, wherein the flattening layer is configured to convert the retained feature maps with selected columns removed to a single dimensional linear vector;
a dense layer connected to the flattening layer, wherein the dense layer is configured to connect each feature of a retained feature map to a respective feature of an adjacent previous retained feature map; and
a softmax layer connected to the dense layer, wherein the softmax layer is configured to convert the single dimensional linear vector to a probability density function and determine whether there is a pothole or no pothole in the single dimensional linear vector.

10. A method for pothole monitoring and repair of a road surface overflown by a plurality of autonomous unmanned aerial vehicles (UAVs), comprising:
generating, by a global positioning receiver located in each UAV, location coordinates of the respective UAV;
generating, by the global positioning receiver in a respective UAV, a geo-fenced area of the road surface beneath the respective UAV;
generating, by a video camera located in the respective UAV, a set of video streams of the geo-fenced area beneath each respective UAV;
preprocessing, by a video processor connected to the camera, the set of video streams of the geo-fenced area;
extracting, by the video processor, a set of road frames from the set of video streams;
determining, by a computing unit located in each UAV operatively connected to the video processor, whether there is at least one pothole in each set of road frames within the geo-fenced area;
generating, by the computing unit, a communication packet including the set of road frames, the location coordinates of each of the road frames and the potholes identified in each of the road frames;
transmitting, by the computing unit, the communication packet to a cloud server;
receiving, by the cloud server, the communication packet;
wherein the cloud server includes a computing circuitry, a memory including program instructions, a classifier and at least one processor configured to use the program instructions for:
generating a map of the geo-fenced area of the road surface;
labelling the location coordinates of each pothole on the map;
identifying geographical features in the road frames within the geo-fenced area, wherein the geographical features include population, traffic load, traffic type, and location type;
labelling the geographical features on the map;
extracting pothole features including a number of the potholes within each road frame, an average size of the potholes, and a frequency of a pothole occurrence per kilometer of the geo-fenced area;
applying the pothole features and geographical features to the classifier, wherein the classifier is configured to predict classes for repair actions;
predicting the classes for repair actions, each of the predicted classes being based on a combination of the pothole features and the geographical features;
receiving, by a front-end interface communicably connected to the cloud server, the classes, and the map, wherein the front-end interface includes a computer operatively connected to a display, wherein the computer is configured for:
generating road repair recommendations for each pothole based on each class; and
providing visualization of a pothole repair process on the display.

11. The method of claim 10, wherein the classifier is a random forest classifier.

12. The method of claim 10, further comprising
storing, in database operatively connected to the cloud server, the road frames, the location coordinates of each of the road frames, the potholes identified in the road frames, the geographical features, and the pothole features.

13. The method of claim 10, further comprising:
generating, with a map generator operatively connected to the cloud server, the map of the geo-fenced area of the road surface, wherein the geo-fenced area includes a set of start location coordinates, a set of end location coordinates, and a section of the road surface between the start location coordinates and the end location coordinates.

14. The method of claim 10, wherein the visualization includes an image of each road frame including at the least one pothole, first graphics including the location coordinates of the road frame including at the least one pothole, the number of potholes within each road frame, the average size of each pothole, the frequency of the pothole occurrence per kilometer of the geo-fenced area, the population, traffic load, traffic type and location type, and second graphics including a recommendation for the repair action of each pothole, a schedule for repairing each pothole, and a status of the repair of each pothole.

15. The method of claim 10, further comprising:
selecting, by the computer of the front-end receiver, the repair action from the group consisting of: immediate complete repair, immediate patching, repair within 6 months, and no repair.

16. The method of claim 10, further comprising:
applying, by the computing unit of each UAV, each of the road frames in the geo-fenced area to a deep convolutional neural network trained to identify any potholes in each of the road frames.

17. The method of claim 16, further comprising:
receiving, by an input layer of the deep convolutional neural network, each road frame and its location coordinates;
zero padding, by the input layer, each road frame to normalize its size;
searching, by a first convolution and ReLU layer connected to the input layer, each road frame and generating a feature map of each road frame;
downsampling, by first pooling layer connected to the first convolution and ReLU layer, the feature maps;
calculating, by a second convolution and ReLU layer connected to the first pooling layer, a weighted sum of each feature map and deciding whether to retain or discard the feature map;
downsampling, by a second pooling layer connected to the second convolution and ReLU layer, the retained feature maps;
removing, by a dropout layer connected to the second pooling layer, selected columns in the retained feature maps;
converting, by a flattening layer connected to the dropout layer, the retained feature maps with selected columns removed to a single dimensional linear vector;
connecting, by a dense layer connected to the flattening layer, each feature of a retained feature map to a respective feature of an adjacent previous retained feature map; and
converting, by a softmax layer connected to the dense layer, the single dimensional linear vector to a probability density function and determining whether there is a pothole or no pothole in the single dimensional linear vector.

18. A non-transitory computer readable medium having first instructions stored therein that, when executed by one or more first processors, cause the one or more first processors to perform a method for pothole monitoring and repair of a road surface overflown by a plurality of autonomous unmanned aerial vehicles (UAVs), comprising:

generating, by a global positioning receiver located in each UAV, location coordinates of the respective UAV;
generating, by the global positioning receiver in a respective UAV, a geo-fenced area of the road surface beneath the respective UAV;
generating, by a video camera located in the respective UAV, a set of video streams of the geo-fenced area beneath each respective UAV;
preprocessing, by a video processor connected to the camera, the set of video streams of the geo-fenced area;
extracting, by the video processor, a set of road frames from the set of video streams;
determining, by the one or more first processors, whether there is at least one pothole in each set of road frames within the geo-fenced area;
generating a communication packet including the set of road frames, the location coordinates of each of the road frames and the potholes identified in each of the road frames;
transmitting the communication packet to a cloud server;
receiving, by the cloud server, the communication packet, wherein the cloud server includes a computing circuitry including a second non-transitory computer readable medium, a memory including second program instructions, a classifier and at least one second processor configured to use the second program instructions for:
generating a map of the geo-fenced area of the road surface;
labelling the location coordinates of each pothole on the map;
identifying geographical features in the road frames within the geo-fenced area, wherein the geographical features include population, traffic load, traffic type, and location type;
labelling the geographical features on the map;
extracting pothole features including a number of the potholes within each road frame, an average size of the potholes, and a frequency of a pothole occurrence per kilometer of the geo-fenced area;
applying the pothole features and geographical features to the classifier, wherein the classifier is configured to predict classes for repair actions; and
predicting the classes for repair actions, each of the predicted classes being based on a combination of the pothole features and the geographical features.

19. The non-transitory computer readable medium method of claim 18, further comprising:
receiving, by a front-end interface communicably connected to the cloud server, the classes, and the map, wherein the front-end interface includes a computer operatively connected to a display, wherein the computer is configured for:
generating road repair recommendations for each pothole based on each class; and
providing visualization of a pothole repair process on the display.

* * * * *